May 1, 1962  M. B. HALL ETAL  3,032,075
STRAPPING TOOL

Filed Nov. 21, 1957  12 Sheets-Sheet 5

INVENTORS
Marchand B. Hall
Douglas O. Anderson, Jr.
BY Robert F. Platner

D.F. Mullaney
Atty

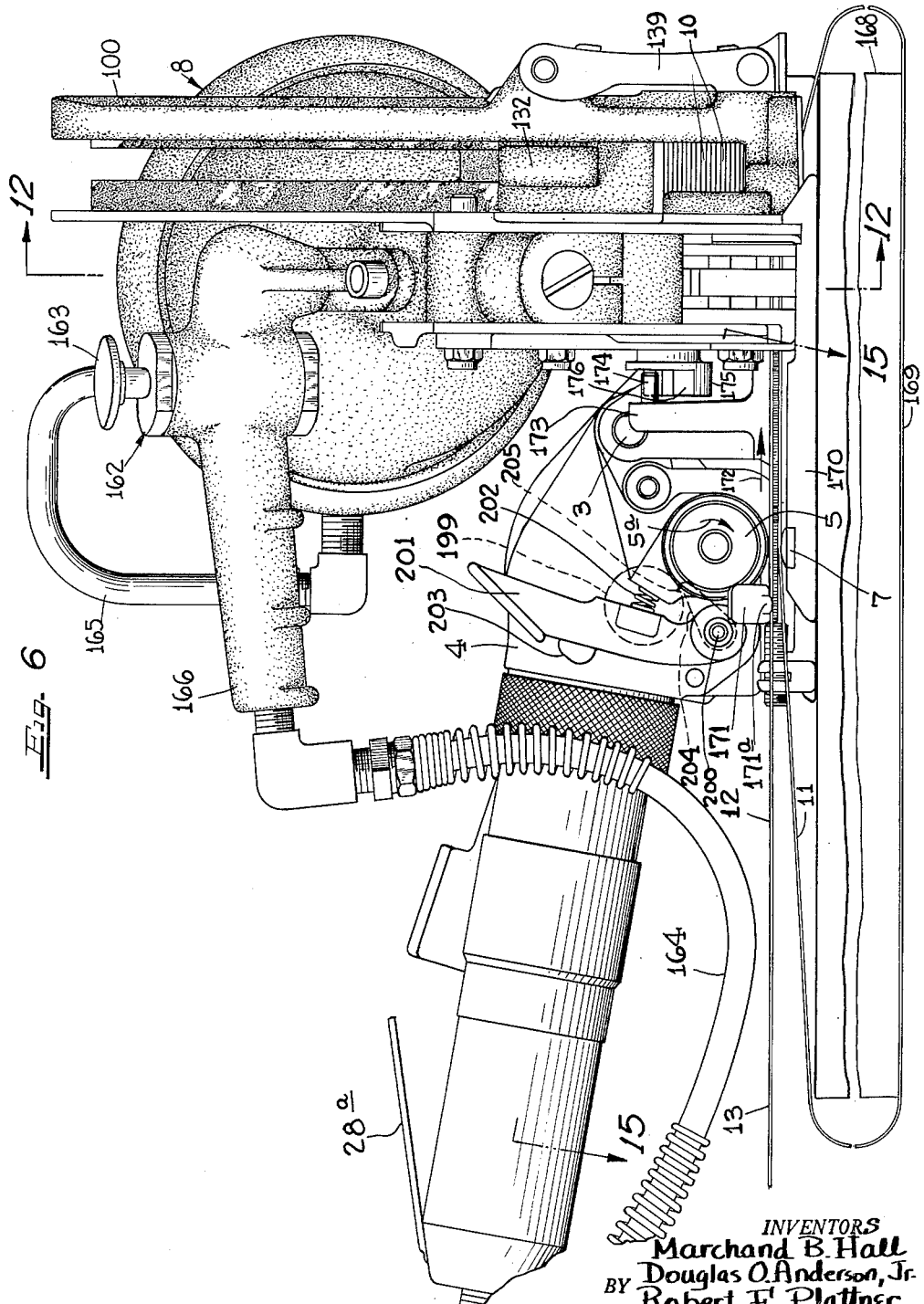

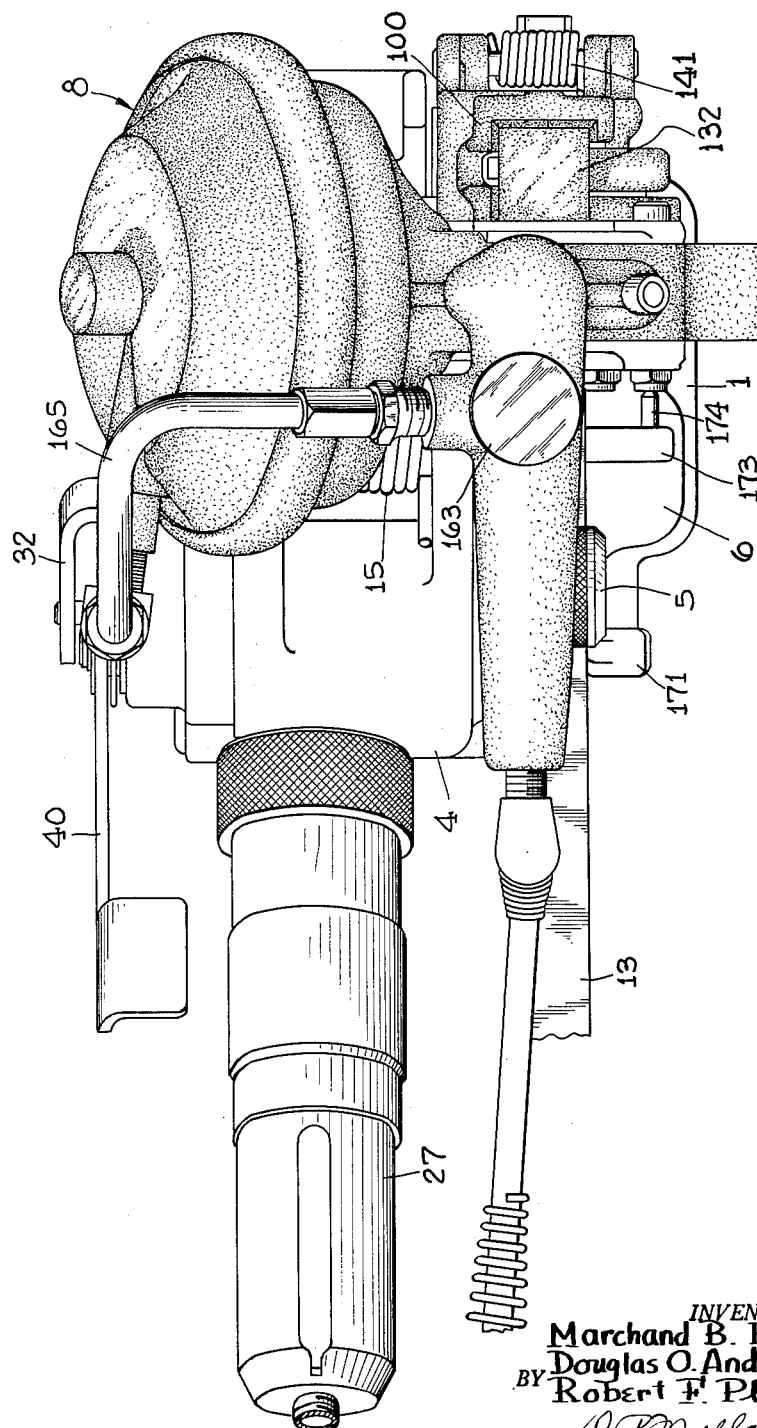

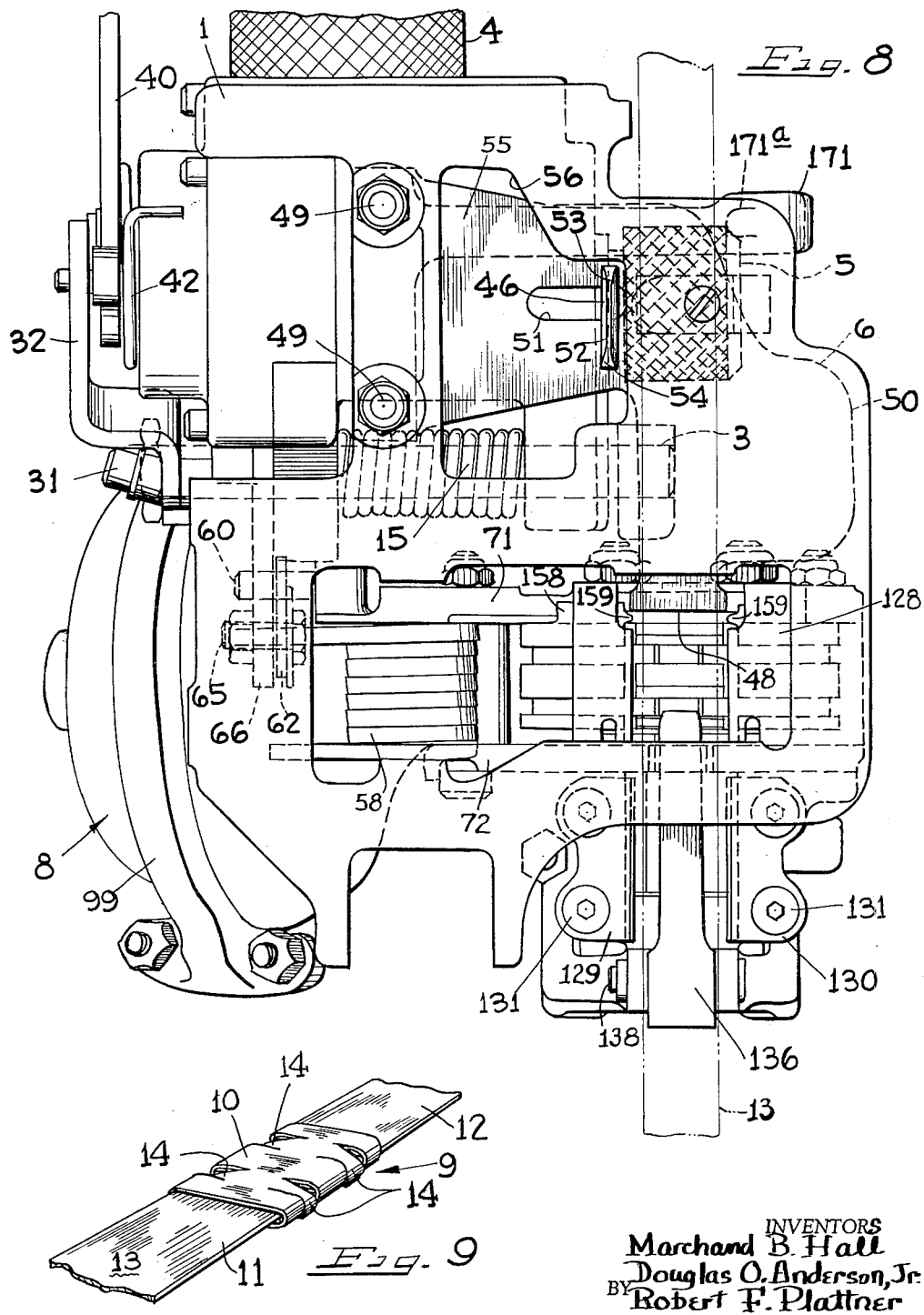

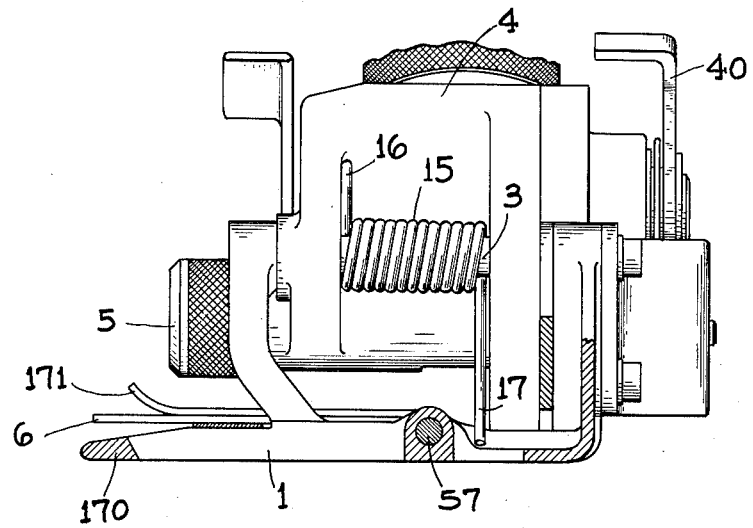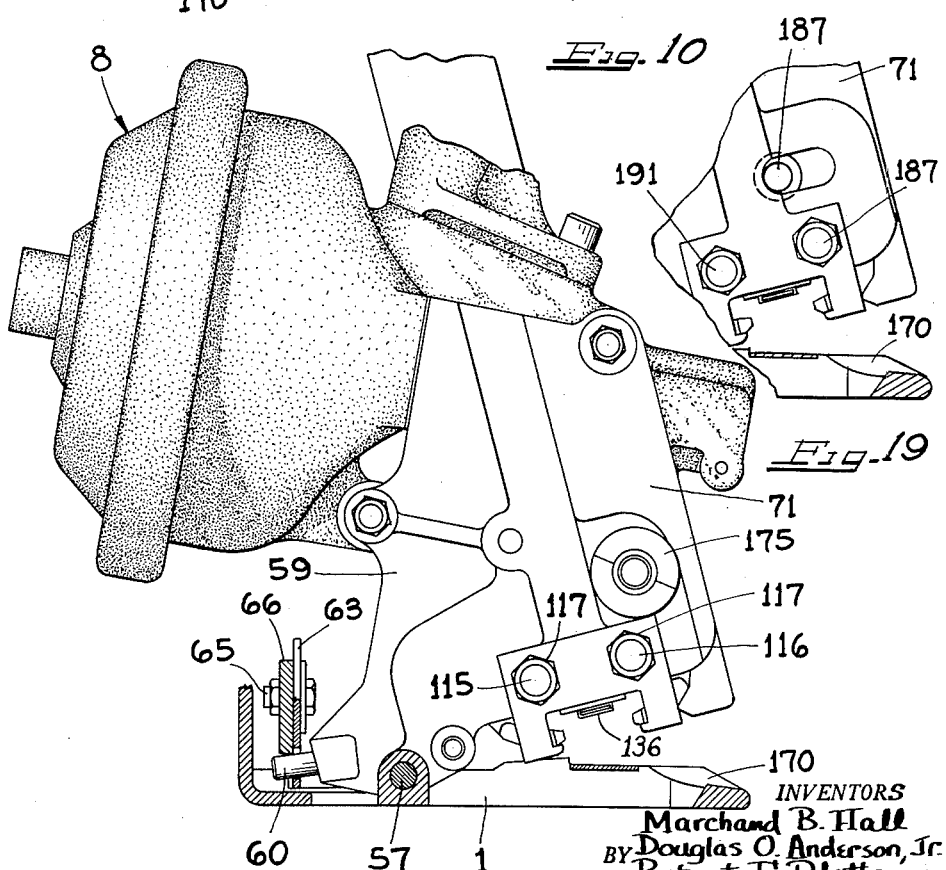

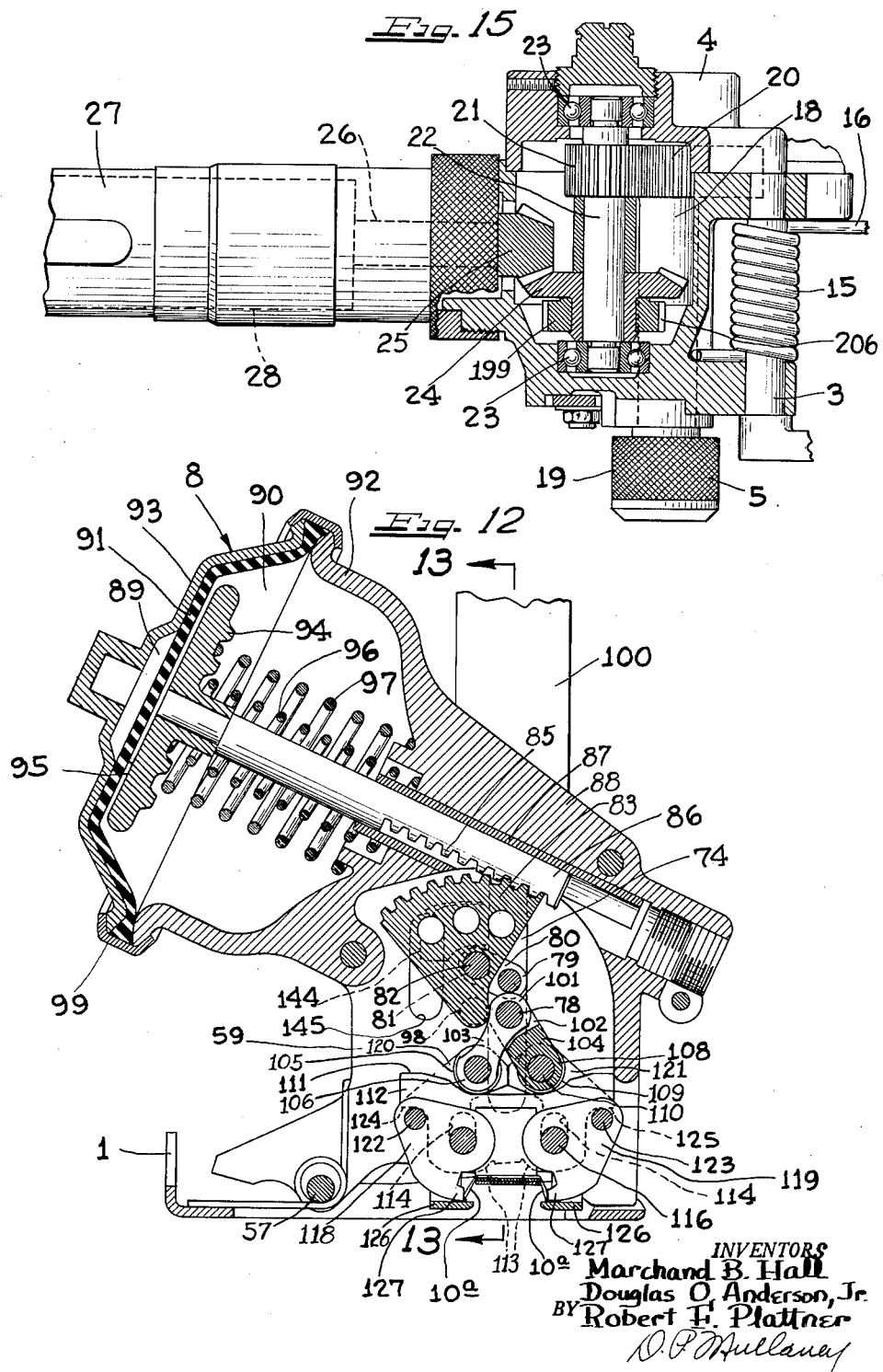

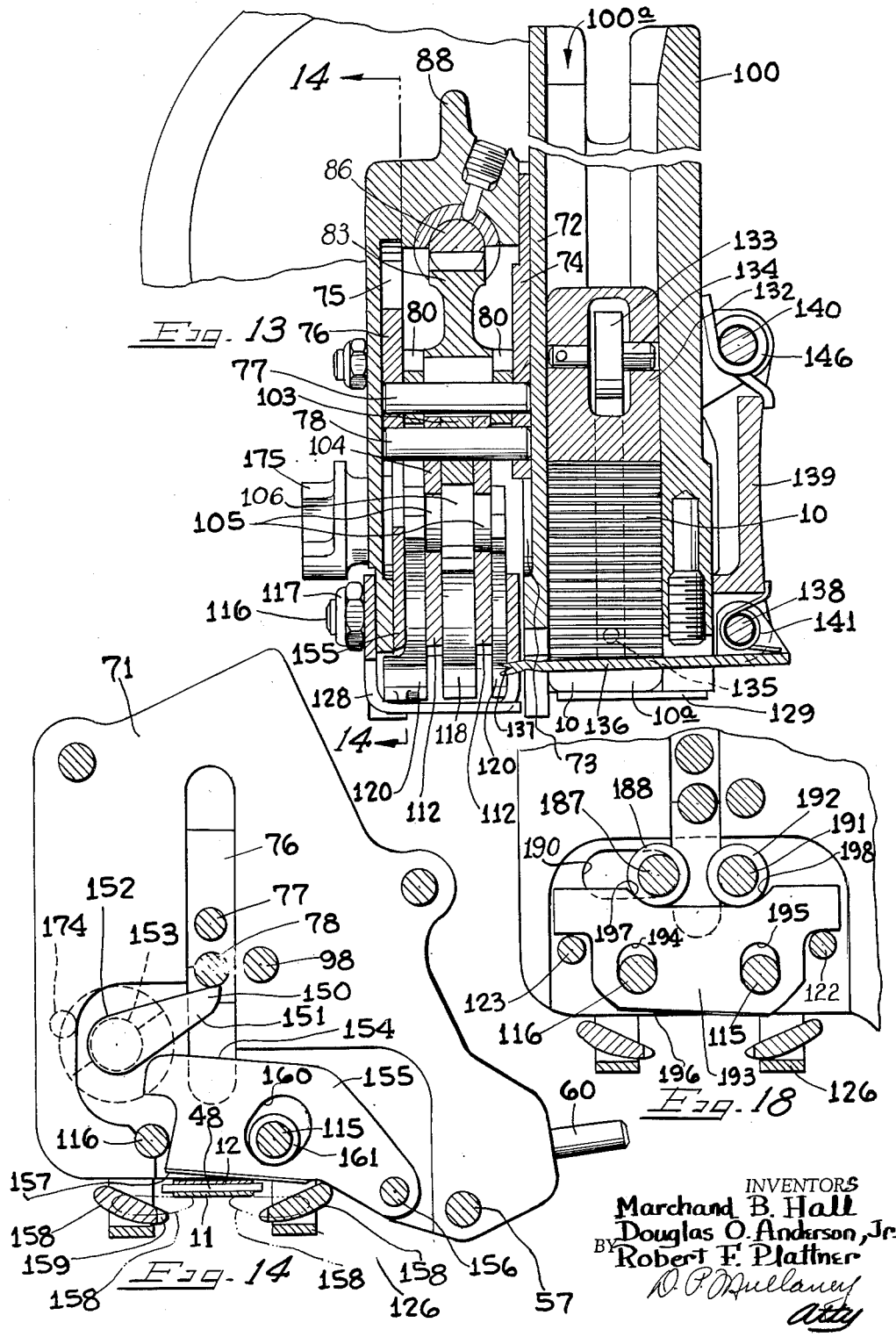

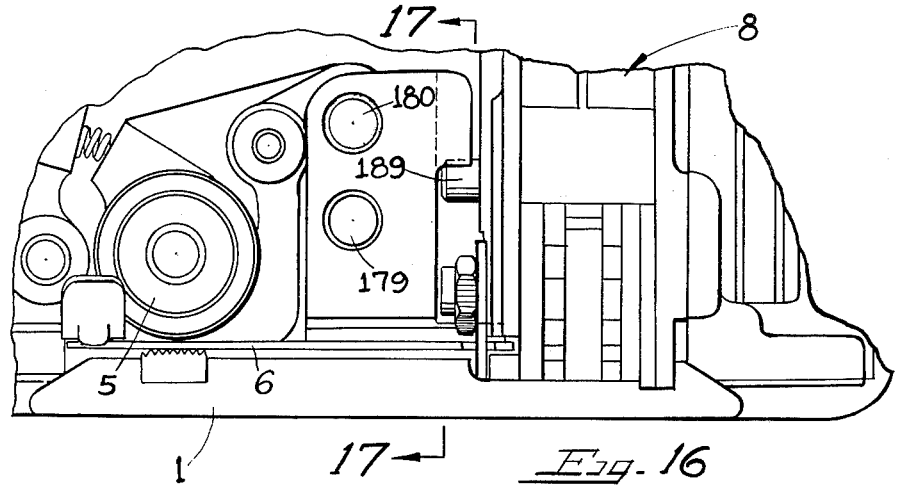
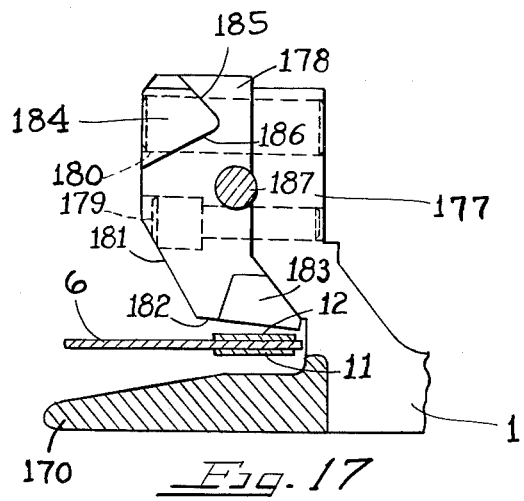

3,032,075
Patented May 1, 1962

3,032,075
STRAPPING TOOL
Marchand B. Hall, Olympia Fields, and Douglas O. Anderson, Jr., and Robert Freeman Plattner, Park Forest, Ill., assignors to Acme Steel Company, Riverdale, Ill., a corporation of Illinois
Filed Nov. 21, 1957, Ser. No. 697,966
20 Claims. (Cl. 140—93.4)

This invention relates to improvements in strapping tools of a type used for joining together the two overlapping strap ends of a loop of strap encircled about a package or other object for binding purposes.

A general characteristic of a tool of the above-mentioned type may consist of a rotary strap tensioning wheel or gripper and a strap gripper jaw. The strap gripper is provided for holding the leading strap end in a fixed position while the rotary strap tensioning wheel is rotated to tension the strap by pulling the supply strap end. For efficient operation of such a tool, it is required that the strap ends be sequentially gripped by the tool, first the leading end and then the supply end, after a strap loop is provided around the package or other object being bound. An ordinary way for actuating the strap gripper and the strap tensioning wheel is by levers independently mounted of each other in the regions of the strap gripper and the tensioning wheel, the lever associated with the gripper jaw being used to operate the gripper while the lever associated with the tensioning wheel being used to position the tensioning wheel. The principal objection to such an arrangement is that direct control and manipulation at two stations on the tool is required when operating both the gripper and the tensioning wheel for releasing or sequentially positioning them. Control and manipulation from a single station is preferable for convenience and the most efficient operation of the tool because it requires only one hand of the operator and leaves his second hand free for alignment of the strap, steadying of the tool, or for other reasons. There are some tools available which overcome the problem to a degree, but they fall short in one way or another. Such tools are evidenced by U.S. Patent No. 2,594,397 issued to William C. Childress et al. on April 29, 1952 and U.S. Patent No. 2,497,313 issued to John H. Leslie II on February 14, 1950.

In a co-pending application of Alvin L. Winkler entitled, Strapping Tool, Serial No. 680,968, filed August 29, 1957, now Patent No. 2,941,782 is shown a similar tool embodying an improved linkage mechanism between the actuating parts for both the strap gripper and the tensioning wheel which eliminates the difficulties of prior art devices by providing means for permitting the sequential operation of the gripper and the tensioning wheel or gripper with simple and full positive control at a single station on the tool.

It is an important object of this invention to provide still another improved mechanism in combination with a strapping tool of the type mentioned for controlling the movements of the gripper and the tensioning wheel or gripper with simple and full positive control at a single station on the tool.

It is another object of this invention to provide improved mechanism for controlling the movements of the strap gripper and the tensioning wheel in combination with such a strapping tool whereby the mechanism also controls the positioning of a sealer head used to fasten together the two overlapping strap ends.

It is still another object of this invention to provide an improved mechanism in combination with such a strapping tool wherein the mechanism controls the positioning of the sealer head in direct response to movements of the housing for the tensioning wheel, the sealer head thereby preventing final positioning of the tensioning wheel until after the sealer head is in sealing position. This arrangement warns the operator, upon failure of the tool to tension because of the tensioning wheel being out of tensioning position, that the sealer head is not positioned, either because of a foreign object in its path or by misalignment of the overlapping strap ends.

It is still another object of this invention to provide an improved mechanism in combination with such a strapping tool wherein the mechanism controlling the positioning of the sealer head in direct response to the movement of the housing for the tensioning wheel permits the sealer head to position at the ends of its travel before the tensioning wheel housing reaches the end of its travel. This is accomplished by providing the tensioning wheel housing with a slight over travel independent of the then stationary sealer head and this accommodates the tool to the use of a wide range of strap thicknesses and compensates for deflection of the strap seat and other parts of the tool during the tensioning period when the tool is subject to extreme stresses.

It is a further object of this invention to provide an improved strapping tool of the type mentioned wherein the sealer head pivots to and from strapping position in a plane perpendicular to the direction of movement of the strap while it is being tensioned.

It is another object of this invention to provide an improved strapping tool of the type mentioned wherein the sealer head is provided with means for insuring that the sealer linkages return to their retracted positions prior to retraction of the sealer head from sealing position. This prevents damage to the sealed joint or to the relatively fixed shear blade which are both partially enclosed by the extended sealer head jaws at the time of sealing.

It is another object of the invention to provide an improved strapping tool of the type mentioned which embodies a rack and gear sector for actuating the sealer head mechanism. The use of the gear sector enables the use of a small size air cylinder to provide maximum torque at the portion of the sealing stroke when maximum force is desired. In addition, the use of a gear sector permits a convenient angular positioning of the sealer head on the strapping tool without sacrificing maximum torque when it is needed.

It is still another object of this invention to provide an improved hand strapping tool in which pneumatic means are used to power both the sealer head mechanism and the strap tensioning mechanism.

It is still another object of this invention to provide an improved strapping tool in which pneumatic means are employed to power both the sealer head mechanism and the strap tensioning mechanism and wherein a releasable checking device independent of the pneumatic means is used to maintain the strap under tension after it has been tensioned while the pressurized air used to operate the pneumatic means for actuating the strap tensioning mechanism is diverted to actuate the sealer head mechanism. This construction permits the use of less pressurized air and/or lower air line pressure because the air is not applied simultaneously to both the strap tensioning and the sealer head mechanisms.

Other objects and advantages of the invention should become apparent from the following description of a preferred embodiment of the invention which is shown in the accompanying drawings, in which:

FIG. 6 is a right side elevation corresponding to the tool as shown in FIG. 5;

FIG. 7 is a top plan view of the strapping tool as positioned in FIGS. 5 and 6;

FIG. 8 is a bottom view of the tool with parts positioned as shown in FIGS. 5, 6 and 7;

FIG. 9 is a perspective view of a typical joint formed by the tool between a tubular metal seal encircled about the two overlapping strap ends of the strap loop used to bind a package or other objects;

FIG. 10 is a sectional view taken along the line 10—10 of FIG. 2 and particularly shows the sealer head or joint forming means raised out of its joint forming position;

FIG. 11 is a sectional view along the line 11—11 of FIG. 2 and particularly shows an end view of the auxiliary frame on which the strap tensioning wheel or gripper is mounted;

FIG. 12 is a sectional view along the line 12—12 of FIG. 6 and particularly shows the linkage associated with the joint forming jaws within the sealer head or joint forming means shown in FIG. 10;

FIG. 13 is a sectional view along the line 13—13 of FIG. 12 and particularly shows the internal mechanism of the joint forming means or sealer head and details of the means for storing and feeding seals to the sealer head;

FIG. 14 is a sectional view along the line 14—14 of FIG. 13 of the means for shearing the supply end of the strap from the strap loop encircled about a package.

FIG. 15 is a sectional view approximately along the line 15—15 of FIG. 6 and particularly shows the internal gearing of the means for rotating the strap tensioning wheel or gripper.

FIG. 16 shows a fragmentary portion of an alternate embodiment of the invention in a view correspondingly similar to the view of the machine as shown in FIG. 6 and shows an alternate means for insuring retraction of the joint forming jaws within the sealer head;

FIG. 17 is a sectional view along the line 17—17 of FIG. 16 and shows details of the cam used for insuring retraction of the joint forming jaws;

FIG. 18 shows an alternate strap shearing mechanism used along with the alternate means shown in FIGS 16 and 17; and FIG. 19 shows an alternate construction of a portion of the sealer head corresponding to the alternate structure shown in FIGS. 16, 17 and 18.

Figure 1:
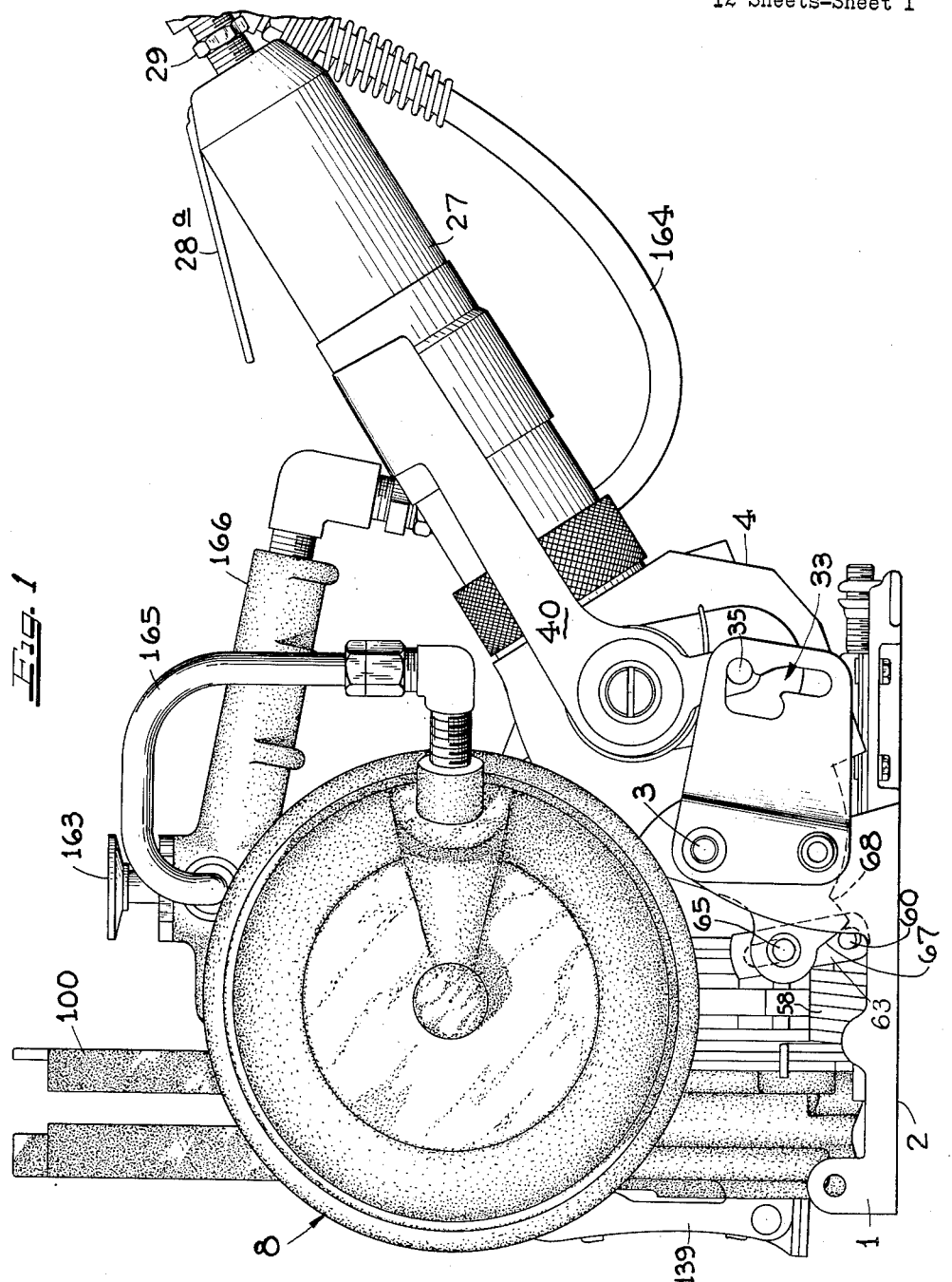
FIG. 1 is a left side elevation of a preferred embodiment of a strapping tool made according to this invention with its parts shown in positions assumed when the tool is ready for the reception of a strap.

A preferred embodiment of the strapping tool of this invention, as shown in FIGS. 1 thru 7, consists generally of a main frame 1 which is provided with a bottom surface 2 adapted to be rested upon or in contact with a package or object to be bound with an encircling loop of strap. Pivoted to the main frame 1 by means of a pin 3 is an auxiliary frame 4 which carries the rotary strap tensioning wheel or gripper 5. Below the position of the auxiliary frame 4 the main frame 1 carries another strap gripper 6 which is in the form of a flat blade. Directly below the strap gripper 6 is a toothed insert or plug 7 mounted in a fixed position in a groove in a strap rest portion 170 extending laterally as part of the main frame 1. When gripping the strap, the leading strap end 11 is gripped between the insert 7 and the strap gripper 6 while the supply strap end 12 is gripped between the tensioning wheel 5 and the strap gripper 6. As will be described, the strap gripper 6 is also used as a shear blade. A generally similar type tool embodying the inclusion of a similar strap gripper as a shear blade is shown and described in a co-pending application entitled, Strapping Tool, Serial No. 607,044, filed August 30, 1956, of Marchand B. Hall, Douglas O. Anderson, Jr. and Edward Staron.

Also pivoted to the main frame 1, but for pivotal movement in a direction transversely of the direction of the strap positioned in the tool, is a sealer head or joint forming means 8. The sealer head 8 may be moved to and from a joint forming position and is used to form an interlocking type joint, as shown in FIG. 9, between portions of a tubular metal seal 10 surrounding the two overlapping ends 11 and 12 of the strap 13. The parts within the sealer head are of a type which cause cutting and deformation of the seal and strap ends in order to form downwardly extending tabs 14 which provide the interlock between the seal and the strap ends to hold the joint together. Even though only four tabs 14 are shown, the sealer jaws can be rearranged and altered to provide as many interlocking tabs 14 as required. Many types of sealers are available and this invention is not intended to be limited to the use of any particular one for the formation of any particular joint.

The auxiliary frame 4 on which the tensioning wheel 5 is mounted is pivoted on pin 3, as shown in FIGS. 8 and 11, with a spring 15 surrounding it. The spring's ends 16 and 17 react between the auxiliary frame 4 and the main frame 1 to urge the auxiliary frame 4 in a counterclockwise direction as viewed in FIG. 2. The auxiliary frame 4 houses means for causing rotation of the tensioning wheel 5. This mechanism is particularly shown in FIG. 15 where the tensioning wheel 5 is shown mounted on a shaft 18 which is journaled in the auxiliary frame 4. The tensioning wheel 5 is provided with teeth 19 on its outer circumferential surface and these teeth can be formed by knurling the surface of the wheel. The purpose of the teeth 19 is to dig into the strap for frictionally engaging the strap for tensioning. The shaft 18 is also provided with a gear 20 which meshes with another gear 21 mounted on a shaft 22 journaled in bearings 23 at either side of the auxiliary frame 4. The shaft 22 is provided at another portion with a bevel gear 24 engaging a bevel gear pinion 25 mounted on a shaft 26 extending perpendicular to the shaft 22. The shaft 26 extends into a housing 27 where it is connected to a motor 28 used to drive the shaft 26 and in turn drive the tensioning wheel 5 through the chain of gears mentioned. The motor 28 is preferably of a rotary type actuated by air pressure fed in from an air line 29 at the outer end of the housing 27.

On the left side of the main frame 1 there is an upwardly extending lug 30 which has connected to it by means of a screw 31 and a nut on the end of the pivot pin 3 a cam plate 32 extending rearwardly of the tool away from where it is fastened to the main frame 1. The cam plate 32 is provided with an opening 33 having an internal border 34 which comprises the cam surface. Projecting within this opening 33 is a pin 35 which is moved to different positions along the cam border 34 when the tool is manipulated to different positions. The cam border 34 has three recesses 36, 37, and 38 which correspond to the locations to which the pin 35 is moved when the auxiliary frame 4 assumes its three positions. The pin 35 is fastened to the lower end 39 of an L-shaped arm 40 pivoted on a stud 41 to the auxiliary frame 4. A helical spring 42 wound on the stud 41 reacts between the auxiliary frame 4 and the arm 40 to urge it in a counterclockwise direction as viewed in FIGS. 1, 3 and 5. The other end 43 of the lever 40 is provided with a laterally extending tab 44 to facilitate manipulation of the lever 40 in either a clockwise or counterclockwise direction while the tool is being operated. With respect to the three positions indicated by the recesses 36, 37 and 38 of the cam plate 32, they correspond to the three positions of the auxiliary frame 4, as already stated. These three positions of the auxiliary frame are shown in FIGS. 1 and 2, 3 and 4, and 5 and 6. When the auxiliary frame 4 is pivoted on its pin 3 to cause the tensioning wheel 5 to be raised to a position far removed from where the tensioning wheel 5 grips the strap, as shown in FIG. 1, the pin 35 is held in the recess 36 of the cam plate 32 by means of the tension of the spring 42. The pin 35 in this position prevents the auxiliary frame 4 from lowering as it resists the force of the spring 15 tending to cause the auxiliary frame 4 to lower. When moving to the second position of the auxiliary frame 4, the end 43 of the lever arm 40 is depressed to cause the pin 35 to move out of the recess 36 of the cam plate 32. The natural tendency, when depressing the lever 40, is to press it as far as it will go. As it is pressed, the pin 35 moves toward the opposite side of the opening 33 in the cam plate 32 and, after the pin 35 is clear of the recess 36, the auxiliary frame 4 drops further because of the force of the spring 15 urging it downward. The auxiliary frame is immediately stopped as the pin 35 contacts the recess 37 of the cam plate 32. When this occurs, the auxiliary frame 4 is in such a position that it has permitted the strap gripper 6 to move to strap gripping position while still holding the tensioning wheel 5 above its strap gripping position. Next, the end 43 of the lever arm 40 is raised. This moves the pin 35 out of contact with the recess 37 and as the pin clears the shoulder 45 of the cam surface 34, the auxiliary frame 4 lowers to its third and final position with the pin 35 positioned within the recess 38 of the cam surface 34. At this time, the tensioning wheel 5 is in a position where it grips the strap so that both the strap gripper 6 and the tensioning wheel 5 are in strap gripping position where they ordinarily grip the adjacent overlapping strap ends 16 and 17.

Figure 2:
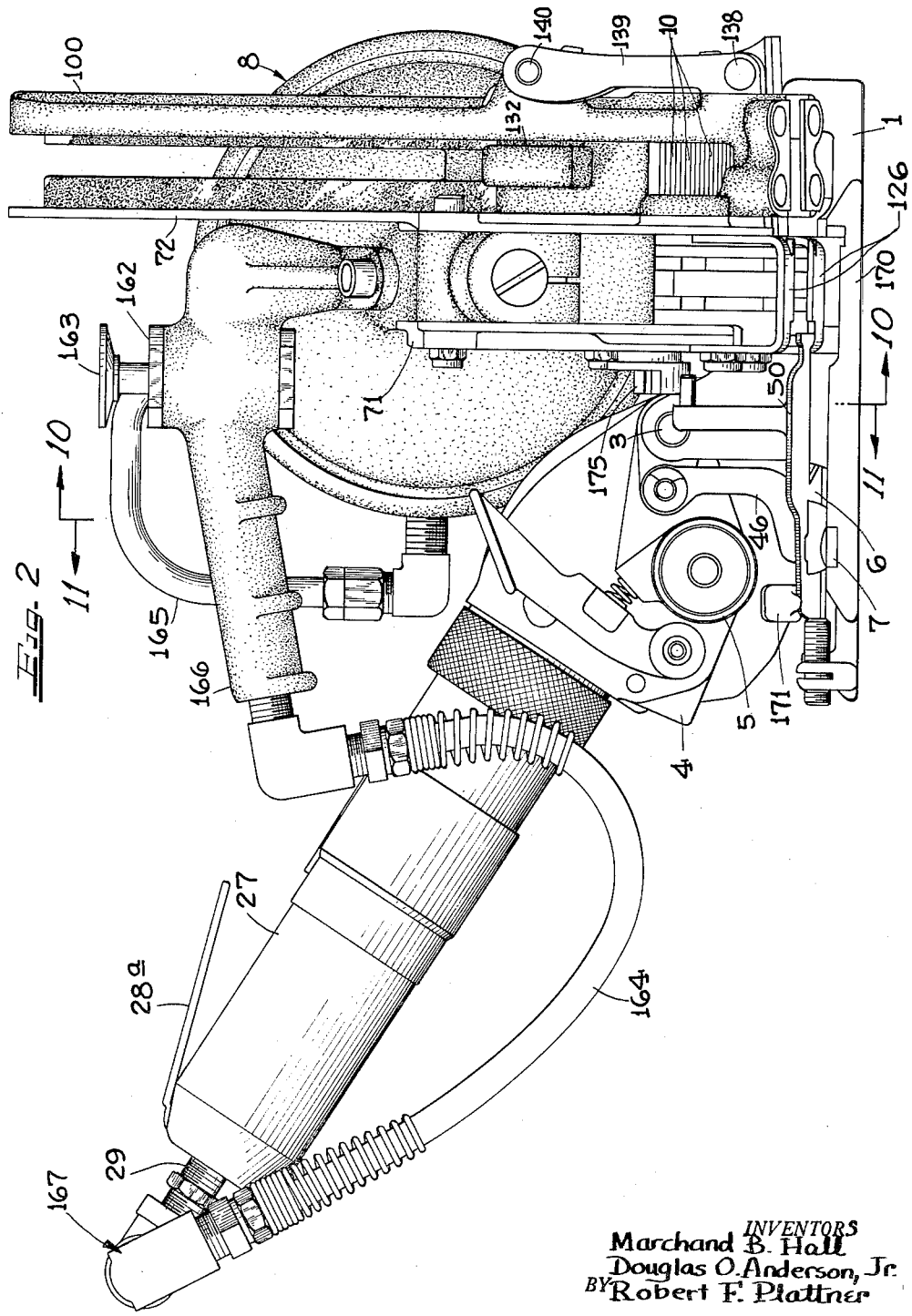
FIG. 2 is a right side elevation of the strapping tool with its parts in the same positions as shown in FIG. 1.
Figure 4:
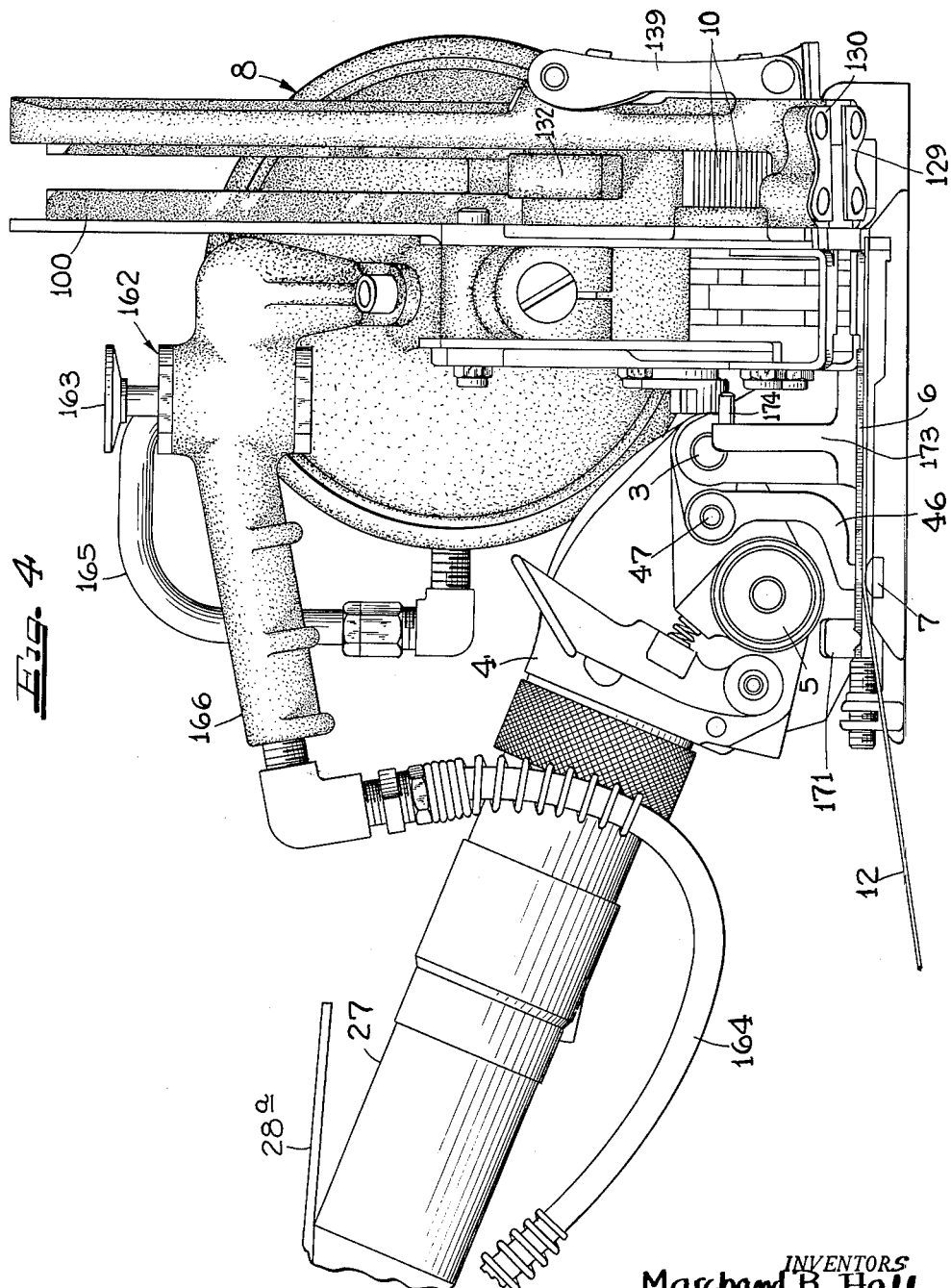
FIG. 4, is a right side elevation of the tool with its parts positioned as in FIG. 3.

The manner in which the auxiliary frame 4 permits the lowering of the strap gripper 6 is accomplished by means of a lever 46 pivoted on a pin 47 to a portion of the auxiliary frame 4, see FIGS. 2, 4, 6 and 8. The strap gripper 6, itself, is of L-shape, as shown in FIG. 8, and has one of its ends 48 terminating in alignment with the strap path and is used as one blade of the shear mechanism for severing the tensioned and sealed strap loop from the supply portion of strap. The other end of the strap gripper 6 is mounted by means of two bolts 49 to the main frame 1, with this mounting arrangement of the strap gripper 6 which is also used as a shear blade, its forward edge 50 is relatively far removed from where it is fastened by means of the bolts 49 of the frame 1 and, therefore, being mounted as a cantilever, and being of relatively thin material, the strap gripper 6 is capable of a wide range of deflection by bending. The arm 46 which is pivoted on the auxiliary frame 4 on the pin 47 passes through a slotted opening 51 in the strap gripper 6 so that its lower end 52 projects immediately beneath the strap gripper 6. This lower end 52 is provided with two laterally extending fingers 53 and 54 which impart a T-shape to the end of the arm 46. These fingers 53 and 54 react against the bottom surface 55 of the strap gripper 6 to resist bending of the strap gripper 6 which ordinarily is urged by its own springiness to lie in a flat position corresponding to that as shown in FIGS. 4 and 6. As the auxiliary frame is raised to where the pin 35 is positioned in the recess 36 of the cam plate 32, the arm 46 raises the strap gripper 6 away from its strap gripping position to a position as shown in FIG. 2. When the auxiliary frame 4 is lowered from a position where the pin 35 is in the recess 36 to a position where the pin 35 is in the recess 37, the strap gripper 6 is lowered from its position as shown in FIG. 2 where it is away from strap gripping position to a position shown in FIG. 4 where it is in strap gripping position, the arm 46 permitting this travel of the gripper 6 as the auxiliary frame 4 pivots downwardly. When the auxiliary frame 4 is lowered still further in order to lower the tensioning wheel 5 to its strap gripping position and when the pin 35 moves from the recess 37 to the recess 38, the arm 46 moves still further downward through an opening 56 in the bottom of the main frame 1 so that its end 52 moves below the gripper 6 with the projecting fingers 53 and 54 of the arm 46 spaced from the bottom surface 55 of the strap gripper 6. On the next movement of the auxiliary frame 4 upwardly on its pivot pin 3, the projecting fingers 53 and 54 of the arm 46 pick up the strap gripper 6 and deflect it upward to a position as shown in FIG. 2 where it is spaced from strap gripping position.

In addition to the auxiliary frame being pivoted on the main frame 1, the joint forming means or sealer head 8 is pivoted to the main frame 1 on a pin 57 (FIGS. 10, 12 and 14) which is provided with a spring 58 encircled about it to react between the sealer head frame 59 and the main frame 1 to urge the sealer head 8 in a clockwise direction as shown in FIG. 12.

Figure 3:
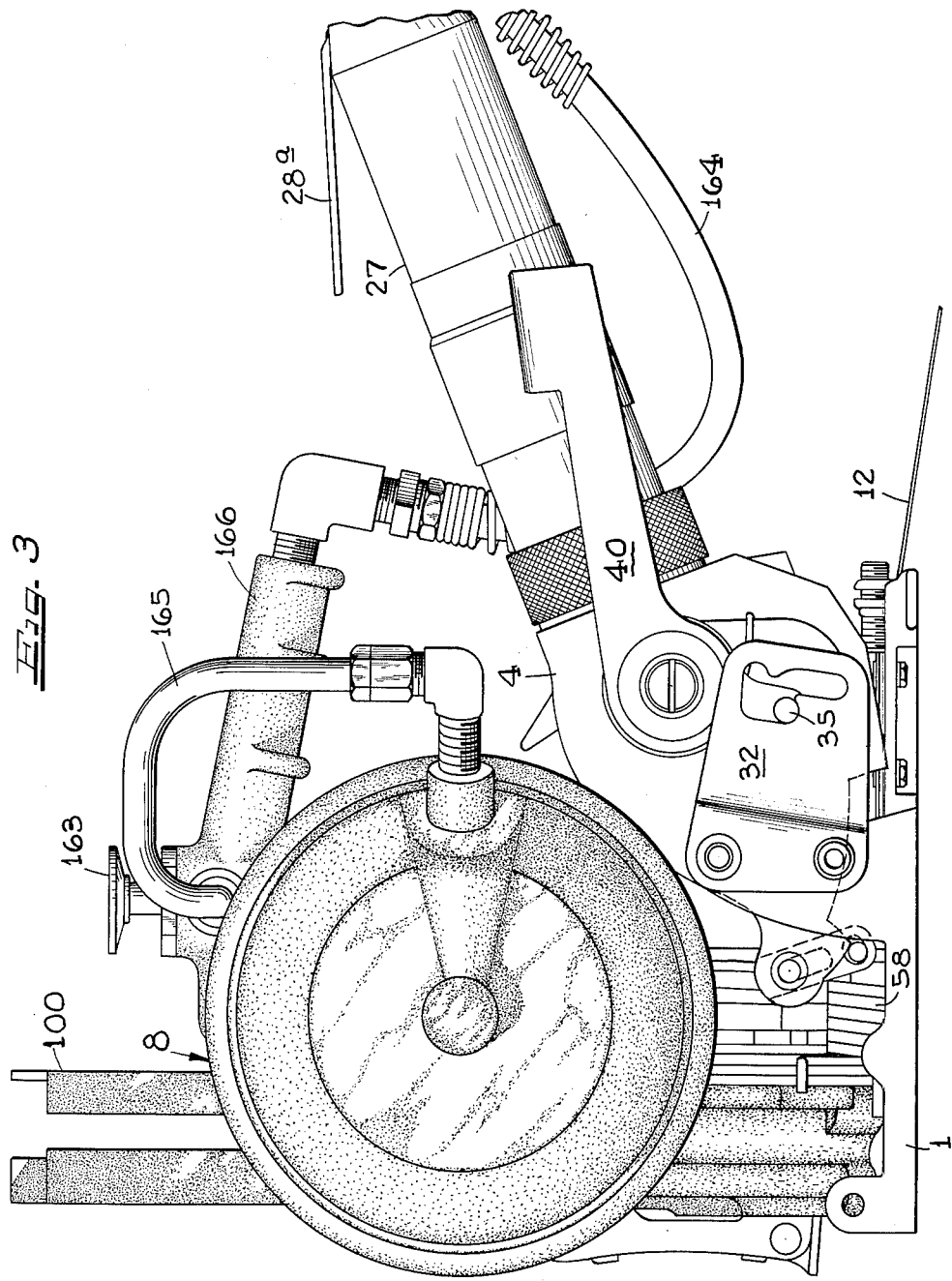
FIG. 3 is a left side elevation of the strapping tool similar to FIG. 1 except that some of the parts are shown shifted to positions corresponding to when the tool is gripping the leading end of a strap received by the tool.
Figure 5:
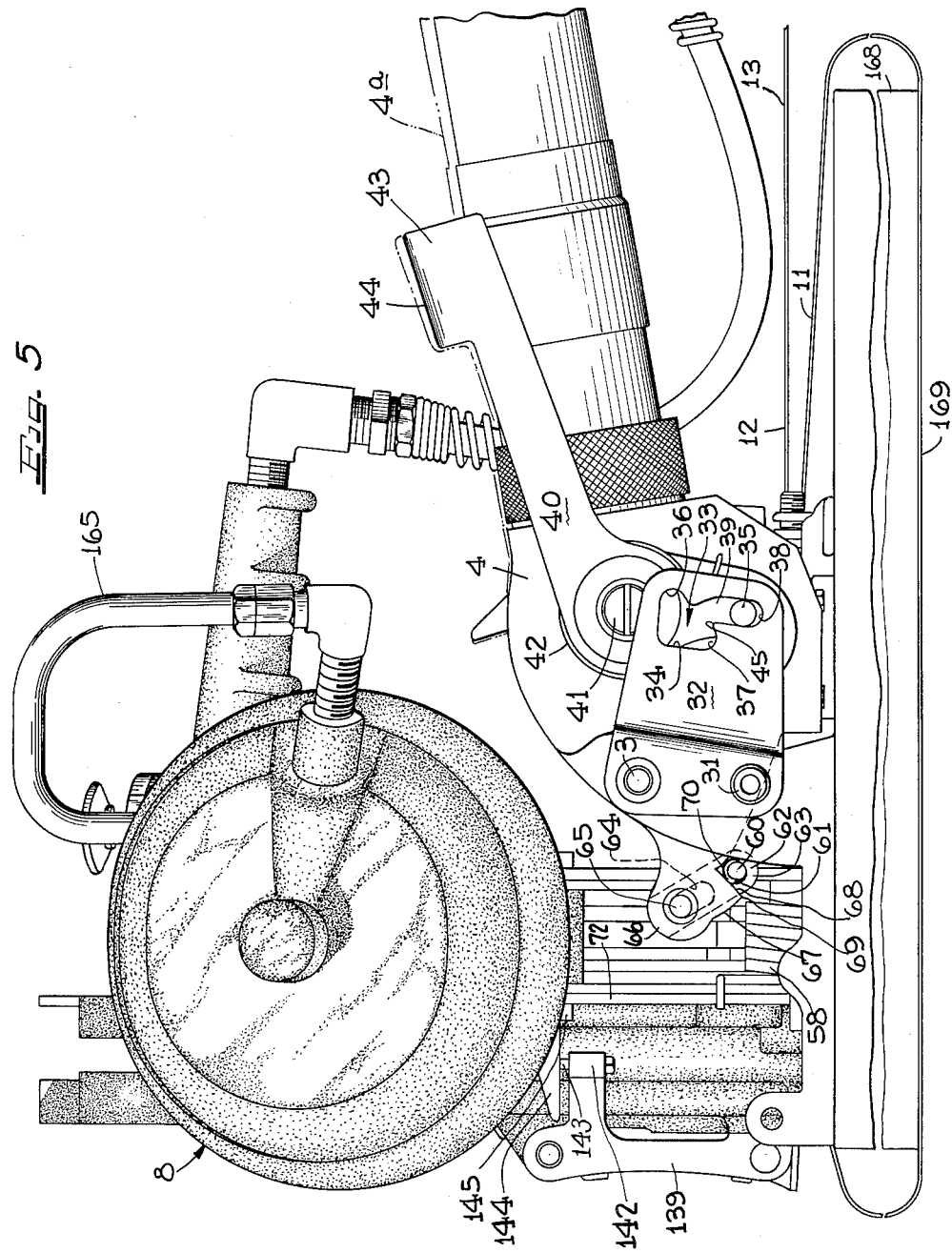
FIG. 5 is a left side elevation of the strapping tool with its parts in positions corresponding to when it is gripping both the leading and supply ends of the strap formed into a loop prior to strap tensioning.

The pivotal movement of the sealer head between its location out of sealing position as shown in FIG. 10 and its location in sealing position as shown in FIG. 12 is controlled directly by the auxiliary frame 4 as it is pivoted on its pivot pin 3. This relationship between the auxiliary frame 4 and the sealer head 8 exists by reason of a pin 60 projecting from the rear end of the sealer head frame 59 which extends through an opening 61 at one end 62 of a line 63 (FIGS. 1, 3, 5 and 10). The upper end of the link 63 is provided with an elongated slotted opening 64 through which a pin 65 is passed to pivotally connect the link 63 to the auxiliary frame 4 to which the pin 65 is attached at a projecting end 66 on the auxiliary frame 4. The projecting end 66 has two important cam surfaces 67 and 68 which intersect each other at a corner 69 at approximately right angles to each other. When all parts of the tool are positioned as shown in FIGS. 1 and 2, the auxiliary frame 4 is pivoted upwardly to its highest position and the cam surface 67 of the projecting ends 66 of the auxiliary frame is resting against pin 60 projecting from the rear end of the sealer head housing 59. In this position, the cam surface 67 is holding the sealer head 8 positioned away from sealing position as shown in FIG. 10 by exerting a downward pressure on the pin 60 because the pin 35 on the auxiliary frame is locked in the recess 36 of the cam plate 32. At this time both the tensioning wheel 5 and the strap gripper 6 are raised away from their strap gripping positions. After the insertion of the leading end 11 of the strap 13 beneath the strap gripper 6, the lever 40 is actuated to cause the pin 35 to move from the recess 36 to the recess 37 in the cam plate 32. During this time the cam surface 67 on the projecting end 66 of the auxiliary frame 4 slides on the pin 60 from a position as shown in FIG. 1 to a position as shown in FIG. 3. At the end of this movement, the cam surface 67 still retains the pin 60 in its same position relative to the frame 1 as at the beginning of the movement. The sealer head 8 is then still held out of sealing position. This is as it should be since only a leading strap end 11 is positioned and it is necessary to position the supply end of the strap 12 in overlapping relationship with the leading strap end before the sealer head 8 can be actuated to cause an interlocking joint between the two strap ends. When the auxiliary frame 4 moves from the position as shown in FIG. 1 to that as shown in FIG. 3 the strap gripper 6 engages the leading strap end 11 which was positioned beneath it. With the leading strap end gripped, the operator then encircles the object to be bound with the strap and applies the supply strap end between the strap gripper 6 and the tensioning wheel 5 which is still positioned well above the lever of the strap gripper 6. At this time the lever 40 is actuated to cause the pin 35 to move from the recess 37 to the vicinity of the recess 38 as the auxiliary frame 4 lowers still further from a position as shown in FIG. 3 to that as shown in FIG. 5. During this movement the tensioning wheel 5 grips the supply strap end 12 against the strap gripper 6 to in turn transmit this gripping pressure against the leading strap end 11 and against the plug 7 to thereby tightly grip both the leading and supply strap ends 11 and 12 in sandwiched relation between all of the gripping parts. During this later movement, the cam surface 67 on the projecting end 66 moves in contact with the pin 60 projecting from the sealer head frame 59 and passes its corner 69 beyond the pin 60 so that the pin 60 raises upwardly into the space adjacent to the cam surface 68 as shown in FIG. 5. This upward movement of the pin 60 occurs as the tension of the spring 58 urges the sealer head 8 to pivot from a position as shown in FIG. 10 to a position as shown in FIG. 12 in readiness for a sealing operation.

From this description, it should be apparent that the movement of the sealer head 8 to and from sealing position is controlled through the movement of the auxiliary frame 4 by means of the cam surfaces 67 and 68 acting in cooperation with the pin 60.

The purpose of the elongated slotted hole 64 is to permit movement of the pin 65 relative to the position of the pin 60 as the auxiliary frame 4 moves between the positions shown in FIGS. 1 and 3. The link 63 is provided to prevent the auxiliary frame 4 from lowering ahead of the sealer head 8 when the sealer head 8 is prevented from complete movement to sealer position because of a foreign obstruction or because it is stopped by the misaligned strap ends. To more clearly understand the relation of the link 63, it should be kept in mind that the cam surfaces 67 and 68 in their action against the pin 60 prevent the sealer head 8 from lowering before the auxiliary frame 4 is lowered while the link 63 prevents the auxiliary frame 4 from moving all the way down in case the sealer head 8 is prevented from moving all the way down. The link would only come into effect between the positions of the tool shown in FIGS. 3 and 5 at a time when the pin 60 passes the corner 69 of the projecting end 66 on the auxiliary frame 4. With this arrangement embodying the link 63, if the sealer head 8 is not lowered to its final sealing position as shown in FIG. 12, due to an obstruction, the auxiliary frame 4 is prevented from lowering all the way so that the tensioning wheel 5 is prevented from being in contact with the upper supply strap end 12. Therefore, if the operator actuates the tool to cause rotation of the tensioning wheel 5 to tension the strap loop, nothing occurs. The operator, upon realizing the failure of the tool to tension, can immediately acknowledge this signal by checking the sealer head for whatever obstruction is preventing it from positioning. After removing the obstruction, the sealer head 8 will position itself and the tool can thereafter be properly operated.

When the parts of the tool are positioned as shown in FIGS. 5 and 6, both the strap gripper 6 and the tensioning wheel 5 are gripping the strap ends 11 and 12. Also, the sealer head 8 is positioned for sealing. In this position of the tool, there is a space 70 deliberately provided between the cam surface 68 of the projecting end 66 and the pin 60 projecting from the sealer head housing 69. This deliberate clearance results from an over travel of the auxiliary frame 4 after the sealer head 8 is finally positioned. This over travel is deliberately provided to compensate for difference in thickness of the strap used as well as for deflection of portions of the tool such as the shaft of the tensioning wheel 5 and the portions of the main frame 1 against which the force of the tensioning wheel 5 reacts when tensioning occurs. As shown in FIG. 5, the auxiliary frame 4 can move a distance upward by an amount equal to the distance between the position of the auxiliary frame 4 shown in bold outline and that as shown in phantom outline at 4a. The slot 64 in the link 63 allows this movement of the auxiliary frame without causing movement of the pin 60 and the sealer head 8. In case the strap used is thicker than that as shown in the drawings, the auxiliary frame 4 will not reach the position of the bold outline in FIG. 5. However, total variation created by increased strap thickness cannot vary more than an amount which will cause the auxiliary frame 4 to be above the position as indicated at 4a. Otherwise, the sealer head 8 will not be entirely moved to sealing position.

The joint forming means or sealer head 8, after it is positioned as shown in FIG. 12 is provided with a mechanism for forming an interlocking joint between the overlapping strap ends similar to that shown in FIG. 9. The sealer head 8 comprises a sealer head frame or housing 59 consisting of two side plates 71 and 72, side plate 71 being the one to which the pin 60 is attached. The spring 58, urging the sealer head into sealing position, is positioned between these side plates 71 and 72.

The side plate 72 is provided with a vertical groove 73 along its inner face. A slide bar 74 is fitted into the groove 73 and is attached to slide longitudinally in the groove. The side plate 71 is also provided with a groove 75 at its inner face and a slide bar 76 slides longitudinally in it. These two slide bars 74 and 76 support the ends of two pins 77 and 78. The pin 77 passes through the outer ends 79 of two links 80 whose inner ends 81 are pivoted on a pin 82 to a portion of a gear sector 83. The gear sector 83 is provided with teeth 84 at its upper surface which is in the form of a segment of a circle. These teeth 84 engage the teeth 85 at the free end of a rack 86. The rack 86 is mounted to slide through a circular opening in a sleeve 87 provided in a housing 88 which is mounted between the side plates 71 and 72. The housing 88 is an air cylinder provided with two air chambers 89 and 90 which are separated by a flexible membrane 91 which is secured at its edges between the two halves 92 and 93 of the housing 88 to provide an airtight seal between chambers 89 and 90. The inner end of the rack 86 is connected to a circular plunger 94 having an outer surface 95 positioned adjacent to the membrane 91. Two helical springs 96 and 97 are mounted concentrically around the rack 86 and react between a portion of the housing half 92 and the plunger 94 to urge the rack 86 in a direction toward the housing half 93. When air under pressure is passed into the chamber 89, the pressure is applied to the membrane 91 to cause it to press against the surface 95 of the plunger 94 and thereby cause the rack 86 to extend and rotate the gear sector 83.

The gear sector 83 is pivoted on two pins 98 which extend from opposite sides of the gear sector 83. These pins 98 are journaled in the oppositely positioned side plates 71 and 72. As the gear sector 83 is rotated in a clockwise direction by means of the rack 86, this causes the link 80 to move the slide bars 74 and 76 vertically downward. As will be explained, this causes the remaining linkages of the sealer head to be actuated to form an interlocking joint as shown in FIG. 9. In addition, this same movement causes shearing of the supply strap end 12 from the strap loop encircled about a package after the joint in FIG. 9 is formed. Upon counterclockwise movement of the gear sector 83, the slide bars 74 and 76 are moved vertically upward by movement of the links 80 to cause the linkages of the sealer head to retract in readiness for another sealing operation. The gear sector 83 provides a very convenient means for providing vertical movement of the slide bars 74 and 76 while permitting the sealer head housing 88 to be positioned at an angle to the vertical. In this particular tool, the sealer housing 88 which has a rather wide circular dimension at its rim 99 can be positioned with the rim 99 clear of the housing 100 which contains a supply of seals. This angular positioning of the housing 88 permits the housing 100 to be positioned in close to the sealer head side plate 74 so that the seal feed stroke can be minimized. This has an advantage because it reduces the size of the tool and simplifies its construction.

The pin 78 which is driven by the slide bars 74 and 76 is also journaled in the upper ends 101 and 102 of two links 103 and 104. The link 103 is of a single thickness and is provided with two rollers 105 on a pin 107 at its lower end 106, the rollers 105 being mounted on opposite sides of the link 103. The link 104 is forked to provide two ears at its upper end 102. The upper end 101 of the link 103 is positioned between the two ears at the upper end 102 of the link 104. The lower end 108 of the link 104 is provided with two rollers 109 mounted on a pin 110, these rollers 109 being positioned on opposite sides of this lower end 108 (only one of the rollers 109 is visible in the drawings). These four rollers 105 and 109 are used to bear against the upper surfaces 111 of two vertically movable punches 112 to cause their downward movement. The downward movement is caused as the rollers 105 and 109 are moved laterally away from each other and ride up the sloped portions of the upper surfaces 111 of the punches 112.

The movable punches 112 are provided at their lower mid-portions with two sloped cam surfaces 113 which, when lowered, react against the metal seal 10 to form the sloping tabs 14 as pictured in FIG. 9. These movable punches 112 are each provided with two closed slotted openings 114 which are guided on pins 115 and 116 which confine them laterally during their vertical movement. These pins 115 and 116 are passed through openings in the side plates 71 and 72 and are there held in place by means of nuts 117 threadably connected at their outer ends. These pins 115 and 116 are also the pivot pins for the two middle jaws 118 and 119 and the four outer jaws 120, and 121. These jaws and punches are, therefore, stacked in sandwiched relationship, as shown in FIG. 13, on the pin 115, as, a jaw 120, a punch 112, a jaw 118, a punch 112, and another jaw 120. On the pin 116, the sandwiched relationship is a jaw 121, a punch 112, a jaw 119, a punch 112, and a jaw 121. The three jaws pivoted on the pin 115 are connected together by means of a pin 122 so that all three jaws pivot as a single integral unit on the pin 115. Similarly the three jaws pivoted on the pin 116 are connected together by means of a pin 123 so that these three jaws also pivot as if an integral unit on the pin 116. Although there are no further connections on the middle jaws 118, the upper ends of the jaws 120 and 121 extend upwardly to where they are pivoted on the pins 107 and 110 which are the same pins that support the four rollers 105 and 109. The pins 122 and 123, in addition to connecting the jaws together, cause upward vertical movement of the punches 112 on the return stroke of the sealer mechanism as the pins 122 and 123 react against surfaces 124 and 125. With this linkage arrangement, when the rack 86 is extended by the admission of air under pressure into the chamber 89, the slide bars 74 and 76 are caused to move downward to in turn cause downward movement of the punches 112 and pivotal movement of the jaws 118, 119, 120 and 121. As this occurs, the sloped surface 113 reacts against the upper surface of the seal 10 which is positioned with its legs 10a resting upon portions 126 of the U-shaped bridge 128 which is supported by means of the pins 115 and 116. Also during this downward movement of the slide bars 74 and 76, the jaws which are provided with projecting tips 127 pivot to move these tips 127 closer together. These tips 127 push the seal legs 10a beneath the two overlapping strap ends which are, at this time, in alignment through the seal 10. Upon further movement these tips 127 react against the bottom portions of the overlapping straps while pressing against the seal legs 10a to serve as the reaction forces opposing the downward force exerted by the sloping portions 113 of the punches 112. This action causes the tabs 114 to be severed and bent downwardly to form the interlocking type joint as shown in FIG. 9.

After the joint is formed, it is necessary to return the sealer jaws and punches to their original starting position as shown in FIG. 12. This is accomplished by means of the coil springs 96 and 97 which cause retraction of the rack 86 after pressurized air is exhausted from the chamber 89. This causes the slide bars 74 and 76 to move vertically upward and thereby retract all of the parts.

The vertical movement of the slide bars 74 and 76 also accomplish another function of the tool. It is that which is associated with the feeding of a seal from a seal stack into position between the sealer jaws with the seal legs 10a resting on the portions 126 of the bridge 128. Attached to the sealer head 8 is a seal stack housing 100 which is connected to the side plate 72. It is provided with a rectangular shaped opening 100a extending for its entire length vertically and has an open top into which the seals can be passed. These seals 10, as shown in FIG. 13 are stacked one upon the other with their legs 10a extending downwardly. The lowermost seal 10 rests with its legs 10a positioned upon the upper surface of two plates 129 and 130 which are secured to the base of the seal stack housing 100 by means of four screws 131. Above the seal stack is a plunger 132 which rests upon the uppermost seal 10 and bears down upon it by means of pressure exerted by a helical spring 133 wound around and fastened at its upper end to a pin 134 and at its lower end to a pin 135 connected at the lower end of the housnig 100. The pin 134 is fastened to the plunger 132. In order to add new seals to the seal stack housing 100 as the seals are used up, the plunger 132 is removed from the open end of the seal stack housing 100 by pulling it upward against the force of the spring 133 which unwinds sufficiently to permit such travel. With the plunger 132 clear of the top of the housing 100, more seals can be added. After they are added, the plunger 132 is again replaced to a position comparable to what is shown in FIG. 13. Immediately below the lowermost seal 10 in the seal stack, is a flat blade 136 which is the seal feed finger. The free end of this finger 136 is provided with a V-shaped groove 137 for engaging the rear end of a seal during the seal feed operation. The other end of the seal feed finger 136 is provided with upwardly extending tabs which are pivoted on a pin 138 to one end of a bell crank arm 139 which is pivoted on a pin 140 to the side of the seal stack housing 100. As viewed in FIG. 13, a spring 141 is encircled about the pin 138 and its ends react between the bell crank arm 139 and the seal feed finger 136 to cause the finger to be urged in a clockwise direction. As viewed in FIG. 5, another projecting end 142 of the bell crank arm 139 is provided with an adjustable screw 143 whose end reacts against the free end of a lever 144. This lever 144 is L-shaped and passes through an opening 145 provided in the side plate 72. Its inner end is connected to the slide bar 74 as viewed in FIG. 12. With this arrangement, as the slide bar 74 slides vertically downward in its groove 73, the arm 144 reacts against the adjustable screw 143 to lower the end 142 of the bell crank arm 139. Another spring 146 encircles the pin 140 and its ends react between the seal stack housing 100 and the bell crank arm 139 so that the end 142 lowers against a force exerted by the spring 146. As the end 142 is lowered, the bell crank arm 139 rotates in a counterclockwise direction as viewed in FIG. 13. This rotation causes the seal feed arm 136 to move away from the sealer jaws to a point where the groove 137 at its end passes completely beneath the seal stack to where it engages the edge of the lowermost seal in the stack. When the slide bar 74 is raised vertically, this permits the force of the spring 146 to return the bell crank arm 139 to its position as shown in FIGS. 5 and 13. While positioning, the seal feed arm 136 moves the lowermost seal into position between the sealer jaws, as shown in FIG. 12, with the seal legs 10a resting upon the bridge portions 126. Therefore, it is apparent that the seal feed arm 136 moves back to pick up a seal for delivery to the sealer jaws at a time when the sealer jaws and punches are being actuated to form a seal joint as the type shown in FIG. 9. The seal feed finger 136 fits a seal into position between the sealer jaws after the sealer jaws are retracted sufficiently to permit the travel of a seal between the jaws. It should be noted that the sealer jaws 120 and 121 which are nearest to the seal stack housing 100 act as a gate for the seal and permit its passage only when they are sufficiently retracted.

When the joint of FIG. 9 is almost completely formed by the action of the punches and sealer jaws, the final downward movement of the slides 74 and 76 causes the pin 78 to contact the outer end 150 of a lever 151 as shown in FIG. 14. The inner end 152 of this lever 151 is fastened to a pin 153 which is journaled in the side wall 71. As the pin 78 moves downwardly, the arm 151 pivots downwardly to contact the upper surface 154 of a shear blade 155. The shear blade 155 is pivoted on a pin 156 to the side plate 71 so that as the arm 151 moves downwardly it causes downward pivotal movement of the shear blade 155. The shear blade 155 is provided with a sharpened cutting edge 157 at its lower edge and this shear blade reacts against the supply strap end 12 to shear it from the strap loop by reacting against the end 48 of the strap gripper 6. During the time that the shear blade 155 is lowered, the strap gripper 6 is supported adjacent its end 48 by means of projections 158 extending laterally as a part of the sealer jaws 120 and 121 which are positioned adjacent to the shear blade 155. The projections 158 are also provided with inwardly extended tips 159 to further assist in supporting the end 48 of the strap gripper 6. The positions of these projections 158 are shown in phantom lines in FIG. 14. The shear blade 155 is provided with a slotted opening 160 through which the pin 155 passes. A sleeve 161 is mounted on the pin 115 to provide free rolling action between the sleeve 161 and the slot 160 during the time that the shear blade 155 is moved. Although the arm 151 causes the downward movement of the shear blade 155, the projection 158 nearest to the pivot pin 156 causes upward retraction of the shear blade 155 after sealing and shearing have been completed and the sealing jaws have been retracted. Upon complete retraction, the projections 158 are positioned as shown in bold outline in FIG. 14.

As stated, in order to cause the three basic functions of the sealer head 8 to be performed, viz., sealing, shearing and seal feeding, air under pressure must be admitted to the chamber 89 of the sealer head. As viewed in FIGS. 1, 2, 3, 4, 5, 6 and 7, a valve 162 is provided. This valve is of a conventional type and is provided with a plunger 163 which may be depressed against a spring return to cause it to open and admit air from an air pressure source line 164 to another air line 165 which is coupled directly into the chamber 89. The valve 162 is housed in an elongated rear portion 166 which is provided with a shape for facilitating its being carried manually. Upon release of the plunger 163, its spring return causes the valve 162 to again be closed and thereby shut off line pressure from the air line 164. At this time the valve also provides exhaust of the chamber 89 through an exhaust port in the valve.

It should be noted that the air line 164 is coupled at 167 adjacent the inlet 29 to the housing 27 containing the air motor 28 for operating the tensioning wheel 5. The actual air supply line which supplies the true source of air pressure is connected to this T-connection at 167 so that the air from a single line is provided to either the air motor 28 or the sealer head 8.

To simplify all of the operations of the strapping tool as already described, a length of strap 13 is drawn off from a source of supply such as a coil or unreeler and the leading strap end 11 is positioned in the tool as shown in FIG. 4 with its extreme end beneath the sealer jaws and extending back over the strap gripper plug 7. At this point the arm 40 has been depressed to permit the auxiliary frame 4 to lower slightly from its position as shown in FIG. 2 to lower the strap gripper 6 against the upper surface of the strap end 11 so that it holds the strap end downwardly against the plug 7. With the strap end 11 gripped in this manner, the strap 13 is formed into a loop 169 with the supply strap end 12 encircling a package or object 168 and fed into the forward end of the tool across the laterally extending strap rest portion 170 in which the plug 7 is fastened. The strap end 12 continues back of the strap gripper 6 beneath the tensioning wheel 5 beneath a flexible strap guide 171 and on to a supply coil, not shown. When the strap 13 is threaded in this manner, the lever 40 is raised in order to cause the further shifting of the auxiliary frame 4 and the sealer head 8 downwardly so that the parts of the tool move from the positions as shown in FIG. 4 to those as shown in FIG. 6. After this movement the strap ends 11 and 12 are gripped by the force of the tensioning wheel 5 pressing against the strap end 12 against the strap gripper 6, the strap end 11 and the plug 7.

The flexible strap guide 171 is merely a flat L-shaped blade as shown in FIG. 8 and is connected to the frame 1 by means of the screws 49 which fasten the strap gripper 6. This strap guide 171 is provided with a lug 171a which projects downward slightly and retains the lateral position of the supply strap end 12. Further, when threading the tool, it is not necessary to feed the strap longitudinally across the strap rest portion 170, but rather it is preferably fed into the tool laterally.

When the parts are positioned as shown in FIG. 6, the sealer head 8 has been pivoted so that a seal 10 positioned between sealer jaws surrounds the overlapping strap ends 11 and 12 in readiness for a joint forming operation. It is significant to note that a seal 10 is fed in between the sealer jaws as the sealer head 8 is in the position of FIG. 6 and the sealer head 8 retracts to a position as shown in FIG. 10 with a seal 10 positioned between the jaws. Before sealing occurs, however, the strap loop 169 must be tensioned on the object 168 by removing slack in the strap loop and tensioning the strap. This is accomplished by introducing air under pressure to the air motor 28 and causing the tensioning wheel 5 to move in the direction of the arrow 5a as shown in FIG. 6. Air is introduced into the air motor 28 by depressing a lever 28a pivoted to the housing 27. This lever 28a is used to actuate a valve (not shown) which may be a conventional spring return air valve positioned adjacent the inlet 29. Because of the position of the pivot pin 3 for the auxiliary frame 4 as the tensioning wheel 5 is rotated, the reaction of the strap in the direction of the arrow 172 causes the tensioning wheel 5 to grip the strap tighter in a self energizing manner. Then, after the tensioning is completed, the sealer head 8 is caused to form a strap joint 9 by operating the valve 162 and admitting air under pressure to the chamber 89 of the sealer head 8. As already mentioned, near the end of the sealing stroke, the seal blade 155 is actuated to sever the supply end 12 from the strap loop 169. At this time the strapping cycle is completed and the operator grips the housing 27 and pivotally raises the auxiliary frame 4. In so doing, both the auxiliary frame 4 and the sealer head 8 which is connected to it by means of the pin 60 are both raised to their positions as shown in FIGS. 1 and 2 in readiness for a new strap cycle. Because the tensioned strap loop 169 holds the tool positioned against the package by reacting against the strap rest portion 170, the upward pivoting of the auxiliary frame 4 and the sealer head 8 can be accomplished without manipulating portions of the tool other than the auxiliary frame 4.

In the operation of the tool, it may be that retraction of the sealer jaws has been obstructed, such as by failure of the chamber 89 to exhaust, sticking of the rack 86, or for other reasons. If this occurs, upon retraction of the sealer head 8, the sealer jaws being partially or completely closed can possibly grip the end 48 of the strap gripper 6 and tend to deflect it upwardly an excessive amount. This is an objectionable condition because it tends to weaken or break the end 48 of the strap gripper 6. Special means have been provided to eliminate this difficulty. This means is particularly shown in FIGS. 2, 4, 6, 10 and 14. An upwardly extending ear 173 projects from the frame 1 and is provided with a laterally extending pin 174 adjacent its upper end. This pin is in the path of a semiannular projection 175 which is connected to the outer end of the pin 153 mounted in the side plate 71 of the sealer head 8. The pin 174 is in the path of the surface 176 of the semiannular projection 175 at a time when the sealer jaws are extended to their positions as shown in FIG. 12. As the sealer head 8 pivots upwardly from its position as shown in FIG. 12 to its position as shown in FIG. 10 and, if the sealer jaws are still closed, the pin 174 strikes the surface 176 and causes the pin 153 to rotate. This causes the arm 151 to rotate and raise the slide bar 76 to retract the sealer jaws. If the sealer jaws are jammed in their extended position, the pin 174 merely prevents the pivotal movement of the sealer head 8 until the jamming has been cleared so that the end 48 of the strap gripper 6 cannot be stressed excessively. If the sealer jaws have been retracted properly, as the sealer head 8 is pivoted upward, the pin 174 will pass the surface 176 and permit the sealer head 8 to pivot completely.

There is an alternate construction for preventing damage to the end 48 of the strap gripper 6 which is particularly shown in FIGS. 16, 17, 18 and 19. It requires modification of certain portions of the frame and sealer head. The alternate construction consists of an upwardly extending lug 177 projecting from the frame 1 in place of the previously mentioned ear 173. This lug 177 is provided with a block 178 which is fastened to the lug 177 by means of a screw 179 and a pin 180. The block 178 is provided with a sloping surface 181 which acts to facilitate threading of the strap 13 into the tool and another surface 182 which is aligned above the path of travel of the two strap ends 11 and 12. This surface 182 also extends immediately above the end 48 of the strap gripper 6 and a special longitudinal extending projection 183 provides the extension as far out as possible of the end 48. At the upper end of the block 178 is another longitudinal extending lug 184 which is provided with two surfaces 185 and 186 which extend at an acute angle to each other. These surfaces are adapted to be engaged by a pin 187 which projects through an opening 190 from behind the side plate 71 of the sealer head 8. The pin 187 is used in place of the pin 110 and carries an additional sleeve or roller 188 adjacent to the inside surface of the side plate 71. The end 189 of the pin 187 which projects through the opening 190 in the side plate 71 is guided in its movement by the side portions of the opening 190 which is in the shape of an elongated slot. In addition, another pin 191 is used instead of the pin 107 and supports another sleeve or roller 192 surrounding it. The rollers 188 and 192 are both in contact with the upper edge of a vertically movable shear blade 193 which replaces the shear blade 155. The same two pins 115 and 116 which hold all of these sealer parts together can still be used in this embodiment. However, the roller 161 is eliminated and these two pins 115 and 116 guide the shear blade 193 in its vertical movement by means of two elongated slots 194 and 195 in the shear blade 193. The lower edge 196 of the shear blade 193 is equivalent to the shear edge 157 on the shear blade 155 and actually performs the shearing operation against the end 48 of the strap gripper 6. In order to cause downward movement of the shear blade 193 to cause shearing of the supply strap end 12, as the rack 86 is extended and the gear sector 83 rotated, the pins 187 and 191 are caused to move away from each other and bear against the sloped portions 197 and 198 at the upper edge of the shear blade 193. This cams the shear blade 192 downwardly to shear the strap end. The two pins 122 and 123 which are used to raise the movable punches 112 on their return stroke are elongated to extend to the region of the shear blade 193 where they raise the shear blade at the end of the shearing operation simultaneously with the raising of the punches 112. The projecting end 189 of the pin 187 is aligned to engage the sloped surface 186 of the block 178 upon the raising of the sealer head 8 in case the sealer jaws have not been retracted. If the sealer mechanism is jammed, the upward pivotal movement of the sealer head is arrested by this contact between the pin 187 and the surface 186. If the jaws are merely slightly frictionally bound or for some other reason are not forced to retract, the pin 187 will be cammed by the surface 186 to cause retraction of the sealer jaws so that they will not retain the end 48 of the strap gripper 6 and thereby excessively stress it during the pivotal movement of the sealer head 8. Further, if, on the downward stroke of the sealer head 8, the sealer jaws are not retracted at the start of the stroke for some reason, the projecting end 189 of the pin 187 will strike the slanted surface 185 and cause the sealer jaws to be retracted.

Because of the surface 182 of the block 178, this alternate construction has an additional advantage. After the strap loop 169 is tensioned on the bound object 168, and the operator wishes to raise the auxiliary frame 4 in order to release the strap grippers from contact with the strap ends, the force applied imparts a movement to the tool which causes the tool to pivot forward and downward, especially on extremely small packages or round objects. If this occurs, it has been found that the end 48 of the strap gripper 6 bears downwardly against the package as the front end of the tool is pivotally lowered. This action causes the end 48 of the strap gripper 6 to be pulled away from the strap rest portion 170 and is as serious as if the sealer jaws gripped the end 48 and raised it because of the excessive deflection. By having the portion 182 extend up to the end 48 of the strap gripper 6 or as near to its end as possible, it is possible to eliminate this difficulty because the strap gripper 6 is prevented from upward movement by the under surface 182 which reacts as backing for it at this time.

There is an additional feature on this tool which permits the use of less pressurized air and/or lower air line pressure line. The means for acquiring this feature maintains tension in the strap loop 169 after air under pressure is shut off to the air motor 28 by opening the valve associated with the air motor 28 by releasing the arm 28a and when air under pressure is admitted to the sealer head 8 by actuation of the air valve 162. The particular structure associated with this means is shown in FIGS. 6 and 15. Fastened on the shaft 22 in the auxiliary frame 4 adjacent the bevel gear 24 is a toothed ratchet wheel 199 which is adapted to rotate integrally with the spur gear 24. Mounted on a pivot pin 200 trunnioned adjacent the base of the auxiliary frame 4 is an upwardly extending lever 201 which is urged in a counterclockwise direction by means of a compression spring 202 reacting between it and a pad on the auxiliary frame 4. This lever 201 is limited in its counterclockwise direction by means of another pad 203 projecting laterally of the auxiliary frame 4. The pivot pin 200 is also provided with a ratchet pawl 204 having a sharpened tooth 205 at its free end. The tooth 205 engages the recesses between the teeth 206 in the periphery in the ratchet wheel 199. With this arrangement, the tooth 205 is urged by the force of the spring 202 into contact with the ratchet wheel and, as the tensioning wheel 5 rotates in the direction of the arrow 5a to tension the strap loop 169, the tensioning wheel 5 is prevented from reverse rotation because of the engagement of the tooth 205 with the ratchet wheel 199. Therefore, after the desired tension in the strap loop 196 is reached, which is dependent upon the degree of air pressure applied to the air motor 28, the air pressure can be shut off to the air motor 28 and the tooth and ratchet wheel will retain the tension in the strap loop. This permits the air pressure to be transferred from the air motor 28 to the sealer head 8 and thereby permits the use of less air and/or lower air line pressure, as already mentioned. In order to release the tension in the strap loop 169, if necessary, the lever 201 can be rotated clockwise against the pressure of the spring 202 and this will release the tooth 205 from the ratchet wheel 199.

Although only one major embodiment of the invention and one modified alternate embodiment have been shown, it should be understood that the invention can be constructed in many different ways without departing from the true scope of the appended claims.

We claim:

1. In a strapping tool for tensioning a loop of strap encircled about an object comprising a frame, a strap rest portion on said frame over which the strap is passed, and a pair of strap grippers located above the strap rest portion, the first strap gripper being mounted on the frame for movement to and from strap gripping position toward the strap rest portion, the second strap gripper being mounted on an auxiliary frame movably mounted on the frame for carrying the second strap gripper to and from strap gripping position toward the strap rest portion, means for urging movement of the auxiliary frame relative to the frame, a lever pivoted to the auxiliary frame and having a projection contacting a cam provided on the frame, the cam being provided with a plurality of distinct stops engageable by the projection as the level is manipulated, the stops determining different distinct positions of the auxiliary frame when it is moved relative to the frame.

2. In a strapping tool for tensioning a loop of strap encircled about an object comprising a frame, a strap rest portion on said frame over which the strap is passed, and a pair of strap grippers located above the strap rest portion, the first strap gripper being mounted on the frame for movement to and from strap gripping position toward the strap rest portion, the second strap gripper being mounted on an auxiliary frame movably mounted on the frame for carrying the second strap gripper to and from strap gripping position toward the strap rest portion, means for urging movement of the auxiliary frame relative to the frame, a lever pivoted to the auxiliary frame, and having a projection contacting a cam provided on the frame, the cam being provided with three distinct stops engageable by the projection as the lever is manipulated, the stops determining three distinct positions of the auxiliary frame when it is moved relative to the frame.

3. In a strapping tool for tensioning and sealing the overlapping ends of a loop of strap encircled about an object comprising a frame, a strap rest portion on said frame over which the strap is passed, and a pair of strap grippers located above the strap rest portion, the first strap gripper being mounted on the frame for movement to and from strap gripping position toward the strap rest portion, the second strap gripper being mounted on an auxiliary frame movably mounted on the frame for carrying the second strap gripper to and from strap gripping position toward the strap rest portion, first means for urging movement of the auxiliary frame relative to the frame, a second means cooperating between the auxiliary frame and the frame for controlling the movements of the second strap gripper toward and away from strap gripping position, a sealer head mounted on said frame for movement to and from sealing position, a third means on said auxiliary frame engaging the sealer head to move the sealer head in response to the movements of said auxiliary frame.

4. In a strapping tool for tensioning and sealing the overlapping ends of a loop of strap encircled about an object comprising a frame, a strap rest portion on said frame over which the strap is passed, and a pair of strap grippers, located above the strap rest portion the first strap gripper being mounted on the frame for movement to and from strap gripping position toward the strap rest portion, the second strap gripper being mounted on an auxiliary frame movably mounted on the frame for carrying the second strap gripper to and from strap gripping position toward the strap rest portion, first means for urging movement of the auxiliary frame relative to the frame, a second means cooperating between the auxiliary frame and the frame for controlling the movements of the second strap gripper toward and away from strap gripping position, a sealer head mounted on the frame for movement to and from sealing position, a third means on said auxiliary frame engaging the sealer head to move the sealer head under the control of said auxiliary frame.

5. In a strapping tool for tensioning and sealing the overlapping ends of a loop of strap encircled about an object comprising a frame, a strap rest portion on said frame over which the strap is passed, and a pair of strap grippers, located above the strap rest portion the first strap gripper being mounted on the frame for movement to and from strap gripping position toward the strap rest portion, the second strap gripper being mounted on an auxiliary frame movably mounted on the frame for carrying the second strap gripper to and from strap gripping positions toward the strap rest portion, first means for urging movement of the auxiliary frame relative to the frame, a second means cooperating between the auxiliary frame and the frame for controlling the movement of the second strap gripper toward and away from strap gripping position, a third means mounted between the auxiliary frame and the first strap gripper for controlling the movements of the first gripper toward and away from strap gripping position, a sealer head mounted on said frame for movement to and from sealing position, and a fourth means on said auxiliary frame engaging the sealer head to move the sealer head in response to the movements of said auxiliary frame.

6. In a strapping tool for tensioning and sealing the overlapping ends of a loop of strap encircled about an object comprising a frame, a strap rest portion on said frame over which the strap is passed, and a pair of strap grippers, located above the strap rest portion the first strap gripper being mounted on the frame, the second strap gripper being mounted on an auxiliary frame movably mounted on the frame, a first means comprising a projection on the auxiliary frame engaging a cam on the frame for sequentially controlling the movements of the second strap gripper toward and away from strap gripping position toward the strap rest portion, second means for urging movement of the auxiliary frame relative to the frame, a third means mounted between the auxiliary frame and the first strap gripper for controlling the movements of the first strap gripper toward and away from strap gripping position toward the strap rest portion, and a fourth means on said auxiliary frame engaging the sealer head to move the sealer head in response to the movements of said auxiliary frame.

7. In a strapping tool for tensioning and sealing the overlapping ends of a loop of strap encircled about an object comprising a frame, a strap rest portion on said frame over which the strap is passed, and a pair of strap grippers mounted on the frame above the strap rest portion a first means connected between the frame and the strap grippers for sequentially controlling the movement of the strap grippers to and from strap gripping positions toward the strap rest portion, a sealer head mounted on said frame for movement to and from sealing position, and a second means connected between one of the strap grippers and the sealer head to move the sealer head in response to the movements to and from strap gripping position of said one strap gripper.

8. In a strapping tool for tensioning and sealing the overlapping ends of a loop of strap encircled about an object comprising a frame, a strap rest portion on said frame over which the strap is passed, and a pair of strap grippers, mounted on the frame above the strap rest portion a first means connected between the frame and the strap grippers for sequentially controlling the movement of the strap grippers to and from strap gripping positions toward the strap rest portion, a sealer head mounted on said frame for movement to and from sealing position, and a second means connected between one of the strap grippers and the sealer head to move the sealer head in response to the movements to and from strap gripping position of said one strap gripper, said second means comprising a cam associated with one of the strap grippers, said cam engaging a projection on the sealer head.

9. In a strapping tool for tensioning and sealing the overlapping ends of a loop of strap encircled about an object comprising a frame, a strap rest portion on said frame over which the strap is passed, and a pair of strap grippers, mounted on the frame above the strap rest portion a first means connected between the frame and the strap grippers for sequentially controlling the movement of the strap grippers to and from strap gripping positions toward the strap rest portion, a sealer head mounted on said frame for movement to and from sealing position, and a second means connected between one of the strap grippers and the sealer head to move the sealer head in response to the movements of said one strap gripper, said second means comprising a cam on an auxiliary frame on which one of the strap grippers is mounted, and a link, the auxiliary frame being mounted for movement on the frame to move said one of the grippers to and from gripping position, said auxiliary frame being biased to urge said one of the grippers to its gripping position, said cam engaging a projection on the sealer head, and said link being pivotally connected between the projection and the auxiliary frame to limit the relative movement between the auxiliary frame and the sealer head.

10. In a strapping tool for tensioning and sealing the overlapping ends of a loop of strap encircled about an object comprising a frame, a strap rest portion on said frame over which the strap is passed, and a pair of strap grippers, mounted on the frame above the strap rest portion a first means connected between the frame and the strap grippers for sequentially controlling the movement of the strap grippers to and from strap gripping positions toward the strap portion, a sealer head mounted on said frame for movement to and from sealing position, and a second means connected between one of the strap grippers and the sealer head to move the sealer head in response to the movements of said one strap gripper, said second means comprising a cam on an auxiliary frame on which one of the strap grippers is mounted, and a link, said auxiliary frame being mounted for movement on the frame to move said one of the grippers to and from gripping position, said auxiliary frame being biased to urge said one of the grippers to its gripping position, said cam engaging a projection on the sealer head, and said link being pivotally connected between the projection and the auxiliary frame to limit the relative movement between the auxiliary frame and the sealer head, said cam being separated from said projection when both grippers are in strap gripping positions and the sealer head is in sealing position.

11. In a strapping tool for tensioning and sealing the overlapping ends of a loop of strap encircled about an object comprising a frame, a strap rest portion on said frame over which the strap is passed, and a pair of strap grippers, mounted on the frame above the strap rest portion a first means connected between the frame and the strap grippers for sequentially controlling the movement of the strap grippers to and from strap gripping positions toward the strap rest portions, a sealer head mounted on said frame for movement to and from sealing position, and a second means connected between one of the strap grippers and the sealer head to permit the sealer head to move in response to the movements to and from strap gripping position of said one strap gripper, said second means providing extended travel of said one strap gripper independently of the sealer head after the sealer head has reached its sealing position.

12. In a strapping tool for tensioning and sealing the overlapping ends of a loop of strap encircled about an object comprising a frame, a strap rest portion on said frame over which the strap is passed, and a pair of strap grippers, mounted on the frame above the strap rest portion a first means connected between the frame and the strap grippers for sequentially controlling the movement of the strap grippers to and from strap gripping positions toward the strap rest portion, a sealer head mounted on said frame for movement to and from sealing position, and a second means connected between one of the strap grippers and the sealer head to permit the sealer head to move in response to the movements to and from strap gripping position of said one strap gripper, said second means providing free movement of the sealer head and the said one strap gripper relative to each other.

13. In a strapping tool for tensioning and sealing the overlapping ends of a loop of strap encircled about an object comprising a frame, a strap rest portion on said frame over which the strap is passed, and a pair of strap grippers, mounted on the frame above the strap rest portion a first means connected between the frame and the strap grippers for sequentially controlling the movements of the strap grippers to and from strap gripping positions toward the strap rest portion, a sealer head mounted on said frame for transverse movement relative to the direction of the strap to and from sealing position, and a second means connected between one of the strap grippers and the sealer head to move the sealer head in response to the movements to and from strap gripping position of said one strap gripper.

14. In a strapping tool for tensioning and sealing the overlapping ends of a loop of strap encircled about an object comprising a frame, means on the frame for gripping the overlapping strap ends and tensioning the strap loop taut about an object, a sealer head mounted on the frame for movement between a retracted position and a sealing position adjacent the overlapping strap ends, the sealer head being provided with joint forming jaws which are extended to form a joint between the overlapping strap ends, means for extending the joint forming jaws, means cooperating between the joint forming jaws and the frame as the sealer head is moved from sealing position for obstructing retraction of the sealer head until the joint forming jaws are retracted.

15. In a strapping tool for sealing the overlapping ends of a loop of strap encircled about an object comprising a frame, means on the frame for holding the ends of the strap loop in overlapping alignment, a housing mounted on the frame for movement between a retracted position and a joint forming position and provided with joint forming jaws which are extended to join together the overlapping strap ends, means for extending and retracting the joint forming jaws, means for obstructing retraction of the housing as the housing is moved from joint forming position after the jaws have been extended to form a joint until the joint forming jaws are retracted, said last means comprising a projection on the frame engaging a cam associated with the joint forming jaws.

16. In a strapping tool for sealing the overlapping ends of a loop of strap encircled about an object comprising a frame, means on the frame for holding the ends of the strap loop in overlapping alignment, a housing mounted on the frame for movement between a retracted position and a joint forming position and provided with joint forming jaws which are extended to join together the overlapping strap ends, means for extending and retracting the joint forming jaws, means for obstructing retraction of the housing as the housing is moved from joint forming position after the jaws have been extended to form a joint until the joint forming jaws are retracted, said last means comprising a projection on the frame engaging a cam pivoted on the housing, the cam engaging a member slidable in the housing, said member being operatively connected to extend and retract the joint forming jaws.

17. In a strapping tool for sealing the overlapping ends of a loop of strap encircled about an object comprising a frame, means on the frame for holding the ends of the strap loop in overlapping alignment, a housing mounted on the frame for movement between a retracted position and a joint forming position and provided with joint forming jaws which are extended to join together the overlapping strap ends, means for extending and retracting the joint forming jaws, means for obstructing retraction of the housing as the housing is moved from joint forming position after the jaws have been extended to form a joint until the joint forming jaws are retracted, said last means comprising a projection on the frame in the path of a cam pivotally mounted on the housing when the joint forming jaws are extended, said cam engaging a member reciprocably mounted in the housing and operatively connected to retract the joint forming jaws as the projection engages the cam upon movement of the housing away from joint forming position.

18. In a strapping tool for sealing the overlapping ends of a loop of strap encircled about an object comprising a frame, means on the frame for holding the ends of the strap loop in overlapping alignment, a housing mounted on the frame for movement between a retracted position and a joint forming position and provided with joint forming jaws which are extended to join together the overlapping strap ends, means for extending and retracting the joint forming jaws, means for obstructing retraction of the housing as the housing is moved from joint forming position after the jaws have been extended to form a joint, said last means comprising a projection on the frame in the path of another projection when the joint forming jaws are extended, the other projection extending through the housing from a member operatively connected to the joint forming jaws, the joint forming jaws being caused to be retracted as the housing is moved away from joint forming position and the two projections engage each other.

19. In a strapping tool for sealing the overlapping ends of a loop of strap encircled about an object comprising a frame, means on the frame for holding the ends of the strap loop in overlapping alignment, a housing mounted on the frame for movement between a retracted position and a joint forming position and provided with joint forming jaws which are extended to join together the overlapping strap ends, means for extending and retracting the joint forming jaws, means for obstructing retraction of the housing as the housing is moved from joint forming position after the jaws have been extended to form a joint until the joint forming jaws are retracted, said last means comprising a cam on the frame in the path, a pin when the joint forming jaws are extended, the pin extending through the housing from a member operatively connected to the joint forming jaws, the pin being moved by contact with the cam to cause the joint forming jaws to be retracted as the housing is moved away from joint forming position.

20. In a strapping tool for sealing the overlapping ends of a loop of strap encircled about an object comprising a frame, and a pair of strap grippers, mounted on the frame for movement toward and away from a portion of the frame over which the ends of the loop of strap are gripped in overlapping relationship by means of the strap grippers, the first of the strap grippers being in the form of a flat blade for gripping the leading end of the strap loop directly against said portion of the frame, the second of said strap grippers being mounted above the level of said first strap gripper for gripping the supply end of the strap loop against the upper surface of said first strap gripper, a fixed projecting lug mounted on the frame adjacent the second strap gripper and above the level of the ordinary level of the supply end of strap as it is gripped between the strap grippers, said lug overhanging the path of travel of said strap ends to thereby limit the movement of said first strap gripper away from said portion of the frame.

References Cited in the file of this patent

UNITED STATES PATENTS

| | | |
|---|---|---|
| 1,874,518 | Harvey | Aug. 30, 1932 |
| 1,996,202 | Harvey | Apr. 2, 1935 |
| 2,336,264 | Leslie | Dec. 7, 1943 |
| 2,661,030 | Crosby | Dec. 1, 1953 |
| 2,831,381 | Lingle | Apr. 22, 1958 |
| 2,831,422 | Black et al. | Apr. 22, 1958 |
| 2,893,689 | Hepler | July 7, 1959 |

FOREIGN PATENTS

| | | |
|---|---|---|
| 929,539 | Germany | June 27, 1955 |